(12) United States Patent
Otsuka et al.

(10) Patent No.: US 7,006,835 B2
(45) Date of Patent: Feb. 28, 2006

(54) METHOD OF AND SYSTEM FOR PROVIDING POSITION INFORMATION

(75) Inventors: Shuji Otsuka, Higashiosaka (JP); Hideji Kawasaki, Neyagawa (JP); Hiroomi Kashu, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 516 days.

(21) Appl. No.: 10/036,516

(22) Filed: Jan. 7, 2002

(65) Prior Publication Data
US 2002/0090956 A1 Jul. 11, 2002

(30) Foreign Application Priority Data

Jan. 11, 2001 (JP) .............................. 2001-004121
Mar. 22, 2001 (JP) .............................. 2001-083478

(51) Int. Cl.
*H04Q 7/00* (2006.01)
*H04M 1/00* (2006.01)

(52) U.S. Cl. .............................. 455/456.1; 455/456.2; 455/456.3; 455/456.6; 455/550.1; 455/560

(58) Field of Classification Search .............. 455/3.02, 455/3.03, 3.04, 412.1, 412.2, 416, 418, 419, 455/420, 456.1, 456.2, 456.3, 456.5, 456.6, 455/460, 463, 404.2, 427, 430, 432.1, 433–434, 455/410–411, 422.1, 456.4, 550.1, 560–561; 342/357.06, 357.09, 357.1, 357.13, 357.17, 342/386; 701/209, 213, 214; 709/203; 340/426.19, 340/426.2
See application file for complete search history.

(56) References Cited

U.S. PATENT DOCUMENTS 5,119,504 A * 6/1992 Durboraw, III .......... 455/556.2
5,517,199 A * 5/1996 DiMattei ................ 342/357.09
5,519,403 A * 5/1996 Bickley et al. ............. 342/352
6,085,090 A * 7/2000 Yee et al. .................... 455/440
6,138,003 A * 10/2000 Kingdon et al. ............ 455/410
6,327,471 B1 * 12/2001 Song ........................... 455/440
6,360,102 B1 * 3/2002 Havinis et al. ............. 455/457
6,397,065 B1 * 5/2002 Huusko et al. .......... 455/435.2
6,400,320 B1 * 6/2002 Stilp et al. ................... 342/457
6,442,391 B1 * 8/2002 Johansson et al. ....... 455/456.2
6,453,237 B1 * 9/2002 Fuchs et al. ................ 701/213
6,600,928 B1 * 7/2003 Ahya et al. ................. 455/518
6,687,504 B1 * 2/2004 Raith ...................... 455/456.1
6,748,318 B1 * 6/2004 Jones ......................... 701/201
2002/0016173 A1 * 2/2002 Hunzinger ................. 455/456
2003/0028621 A1 * 2/2003 Furlong et al. ............. 709/219
2003/0100326 A1 * 5/2003 Grube et al. ............... 455/515

* cited by examiner

*Primary Examiner*—William Trost
*Assistant Examiner*—Meless Zewd
(74) *Attorney, Agent, or Firm*—Armstrong, Kratz, Quintos, Hanson & Brooks, LLP

(57) ABSTRACT

A position information providing system of the invention, portable telephones A and B are connectable to a service center. The telephone A has a GPS processing circuit for measuring its own position and a control circuit. The circuit prepares position information based on the measurements obtained by the GPS processing circuit, also prepares a list comprising the numbers of a plurality of telephones in response to an input manipulation by the user, and transmits the prepared list data to the center. When an information request signal is supplied from the telephone B to the center, the server transmits the position information as to the telephone A to the telephone B only when the number of the telephone B is not included in the list data. Thus, the system realized is adapted to reliably protect the privacy of the person carrying the telephone A.

22 Claims, 21 Drawing Sheets

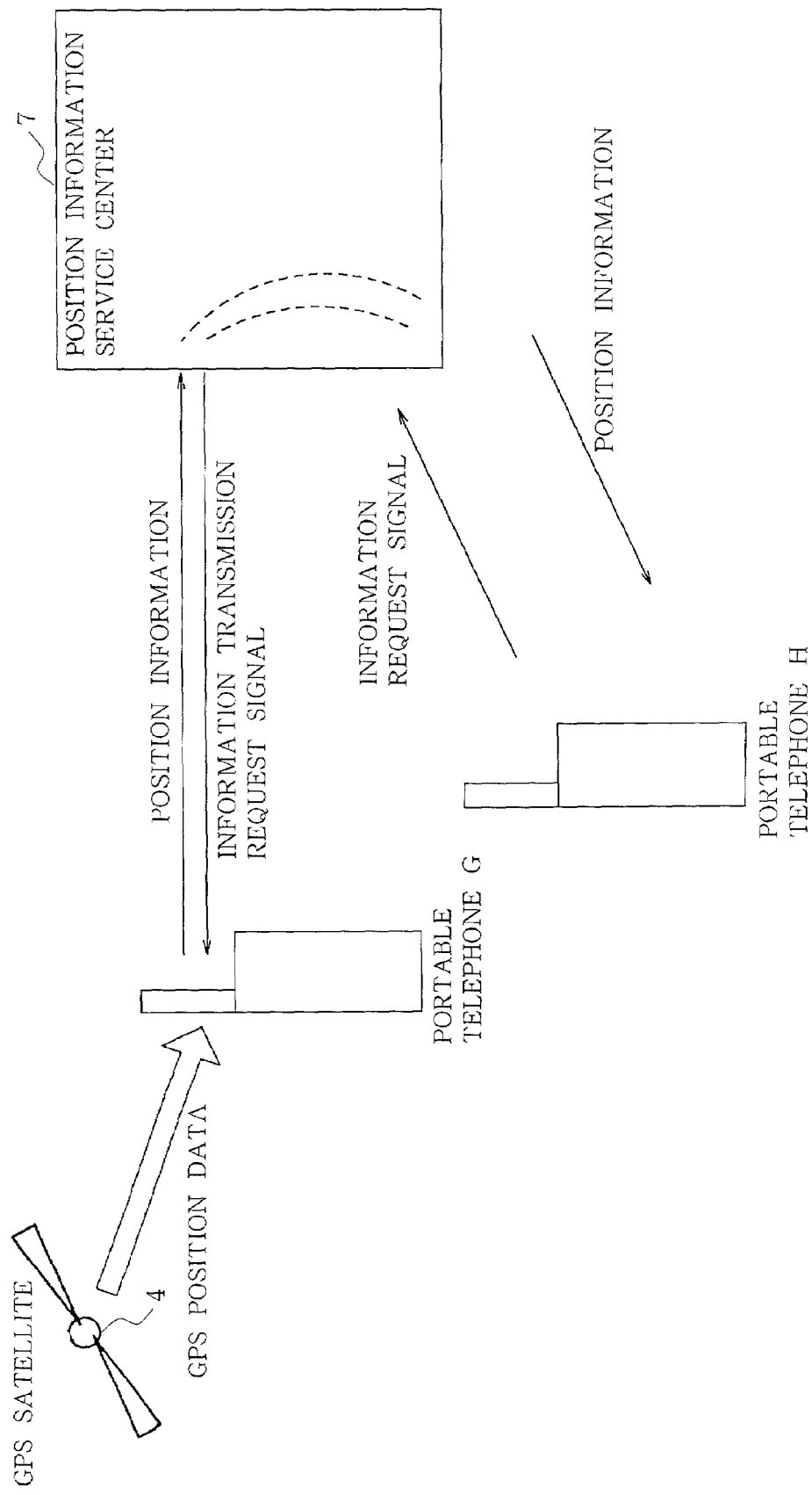

METHOD OF AND SYSTEM FOR PROVIDING POSITION INFORMATION

BACKGROUND OF THE INVENTION

1. Field of the Invention

The present invention relates to methods of and systems for providing position information representing the current position of a portable communications device such as a mobile or portable telephone for the person carrying another portable telephone or a similar communications terminal device.

2. Description of the Related Art

Portable telephones are already known which have a position measuring function such as the function of the GPS (Global Positioning System) which is in actual use in car navigation systems. Services are available in recent years for providing such position information representing the current position of a portable telephone for the person carrying another portable telephone.

FIGS. 20 and 21 show two systems for providing position information which utilize the above position information providing service.

With the system shown in FIG. 20, both a portable telephone E and a portable telephone F can be connected to a position information service center 6 via a base station (not shown).

The portable telephone E has a GPS position measuring function. The telephone E receives GPS position data transmitted from a GPS satellite 4 and prepares position information comprising the latitude and longitude of its own position based on the received position data. The position data prepared is supplied via the base station to the service center 6, where the position information is stored in a database 60 along with information for identifying the telephone E.

When an information request signal requesting to provide information about the position of the telephone E is fed from the telephone F to the service center 6 via the base station, the service center 6 checks whether the password contained in the request signal matches the password of the telephone E. If a match is found, the position information as to the telephone E is supplied from the service center 6 to the telephone F via the base station. In this way, the person carrying the telephone F can recognize the current position of the person carrying the telephone E only when the former knows the password of the telephone E.

With the position information providing system shown in FIG. 21, on the other hand, both portable telephone G and portable telephone H can be connected to a position information service center 7 via a base station (not shown).

The portable telephone G, which has a GPS position measuring function, receives GPS position data from the GPS satellite 4 and prepares position information comprising the latitude and longitude of its own position based on the position data received. The position information prepared is stored in a memory incorporated in the telephone G.

When an information request signal requesting to provide information about the position of the telephone G is fed from the telephone H to the service center 7 via the base station, the service center 7 supplies a signal demanding transmission of the position information to the telephone G. The telephone G checks whether the password contained in the transmission demand signal matches the password of its own. If a match is found, the position information as to the telephone G is supplied from the telephone G to the telephone H via the base station and the service center 7. In this way, the person carrying the telephone H can recognize the current position of the person carrying the telephone G only when the former knows the password of the telephone G.

With the two position information providing systems described, the information as to the position of a portable telephone is provided only for one who knows the password of the telephone, whereby the privacy of the one possessing the telephone is protected.

Although there is a time zone during which the person carrying a portable telephone does not like to have her or his own current position known even by those to whom he has told his own password, the two conventional position information providing systems enable those who know the password to recognize the current position of the person at all times if they request the service center to provide the position information. The systems therefore have the problem of failing to reliably protect the privacy of the person possessing the telephone.

SUMMARY OF THE INVENTION

An object of the present invention is to provide a method of and a system for providing position information which are adapted to reliably protect the privacy of the person carrying a portable telephone or like portable communications device.

The present invention provides a first position information providing system which comprises a portable communications device capable of transmitting by radio communication position information representing the position of the device, and a position information providing device capable of receiving the position information transmitted from the communications device and transmitting the position information to one or a plurality of terminal communications units. The portable communications device comprises:
  means for preparing a list required for checking whether it is approved to provide the position information for the terminal communications unit or units in response to an information input manipulation by the user, and
  transmitting means for converting data as to the prepared list to a radio signal and transmitting the radio signal to the position information providing device. On the other hand, the position information providing device comprises:
  means for receiving the list data from the portable communications device, list register means for registering the list data,
  information processing means for registering the received list data in the list register means,
  means for checking whether provision of the position information for the terminal communications unit is approved based on the list data registered in the list register means, in response to a position information request command from the terminal communications unit, and
  means for transmitting the position information as to the portable communications device to the terminal communications unit only when provision of the position information is found approved.

With the portable communications device of the first position information providing system of the invention, a list required for checking whether it is approved to provide the position information for one or a plurality of terminal communications units is prepared in response to an information input manipulation by the person carrying the portable device. The data on the list thus prepared is transmitted to the position information providing device and registered in the list register means of the information providing device.

When a position information request command is given to the information providing device by the terminal unit, the information providing device checks whether the provision of the position information for the terminal unit is approved based on the list data registered, and transmits the position information as to the portable device to the terminal unit only when the provision of the position information is approved.

If the provision of the position information for the terminal unit giving the position information request command is not found approved, the position information as to the portable device is not transmitted to the terminal unit, thus obviating the likelihood that the current position of the person carrying the portable device will be known to the person carrying the terminal unit. Accordingly, the privacy of the person carrying the portable device can be protected reliably.

The present invention provides a second position information providing system comprising a portable communications device and a position information providing device. The portable communications device comprises:

means for receiving position data from a plurality of position reference stations arranged on a satellite and/or the ground, position measuring means for measuring position information based on the position data received, transmitting means for converting the measured position information to a radio signal and transmitting the radio signal to the position information providing device, and control means for discontinuing the information measuring operation of the position measuring means in response to a position measurement discontinuing manipulation by the user. On the other hand, the position information providing device comprises:

means for receiving a position signal from the portable communications device, means for storing the position information as to the portable communications device, information processing means for performing the operation of storing the received position information in the storing means, checking means operable in response to a position information request command from the terminal communications unit to check whether the position information as to the portable communications device is stored in the storing means during a specified period of time before the reception of the command until the reception, and means for transmitting the position information to the terminal unit only when the position information as to the portable communication device is stored during the specified period of time.

The portable communications device described repeatedly performs the operation of measuring position information based on the position data from the plurality of position reference stations, and the position information is transmitted to the position information providing device every time the information is measured. Every time the position information is received by the information providing device from the portable device, the position information is stored in the storing means.

When a position information request command is given by the terminal unit to the information providing device in this state, the position information from the portable device is interpreted as being stored in the storing means during the specified period of time, and the position information as to the portable device is transmitted to the terminal unit.

When such time comes that the person carrying the portable communications device does not want to have his own current position known, he immediately performs a position measurement discontinuing manipulation, whereupon the position information measuring operation by the measuring means is discontinued, consequently discontinuing transmitting the position information from the portable device to the information providing device. The information providing device discontinues storing the position information in the storing means.

If a position information request command is given by the terminal unit to the information providing device in this state, no position information is found stored in the storing means during the specified period of time. Accordingly, it is unlikely that the position information as to the portable device will be sent to the terminal unit.

When the person carrying the portable communications device performs a position measurement discontinuing manipulation upon arrival of the time when he does not want to have his current position known, no position information as to the portable device will be thereafter transmitted from the information providing device to the terminal unit. This obviates the likelihood that the person carrying the portable device will have his current position known to the person carrying the terminal device, consequently reliably protecting the privacy of the person carrying the portable device.

The present invention provides a third position information providing system comprising a portable communications device and a position information providing device. The portable communications device comprises:

means for receiving position data from a plurality of position reference stations arranged on a satellite and/or the ground, position measuring means for measuring position information based on the position data received, time setting means for setting a position measurement discontinuing time input by the user, time detecting means for detecting arrival of the position measurement discontinuing time set by the time setting means, transmitting means for converting the measured position information to a radio signal and transmitting the radio signal to the position information providing device, and control means for discontinuing the information measuring operation of the position measuring means upon the time detecting means detecting arrival of the position measurement discontinuing time.

On the other hand, the position information providing device comprises:

means for receiving position information from the portable communications device, means for storing the position information as to the portable communications device, information processing means for performing the operation of storing the received position information in the storing means, checking means operable in response to a position information request command from the terminal communications unit to check whether the position information as to the portable communications device is stored in the storing means during a specified period of time before the reception of the command until the reception, and means for transmitting the position information to the terminal unit only when the position information as to the portable communications device is stored during the specified period of time.

The portable communications device repeatedly measures the position information based on the position data from the position reference stations, and the position information is sent to the information providing device every time the information is measured. The information providing device stores the position information in the storing means every time the information is received from the portable communications device.

When a position information request command is given by the terminal communications unit to the information providing device in this state, the position information as to the portable communications device is interpreted as being stored in the storing means during the specified period of time, and the position information as to the portable device is transmitted to the terminal unit.

With the third position information providing system, the person carrying the portable communications device and having a time zone during which he does not want to have his current position known, sets in advance the start time of the time zone as a position measurement discontinuing time.

Subsequently, upon arrival of the position measurement discontinuing time, the position information measuring operation by the position measuring means is discontinued, consequently discontinuing transmitting the position information from the portable device to the information providing device. The information providing device discontinues storing the position information in the storing means.

If a position information request command is given by the terminal unit to the information providing device in this state, no position information as to the portable device is found stored in the storing means during the specified period of time. Accordingly, it is unlikely that the position information as to the portable device will be sent to the terminal unit.

Thus as described above, the person carrying the portable communications device sets the start time of the time zone during which he does not want to have his current position known by others. After the arrival of the time, it is then unlikely that the position information as to the portable device will be transmitted from the information providing device to the terminal unit. This obviates the likelihood that the person carrying the portable device will have his current position known to the person carrying the terminal device, consequently reliably protecting the privacy of the person carrying the portable device.

In this way, the privacy of the person carrying the portable communications device can be reliably protected by the position information providing method and systems of the present invention.

BRIEF DESCRIPTION OF THE DRAWINGS

FIG. 21 is a block diagram showing the construction of a second position information providing system of the prior art.

DETAILED DESCRIPTION OF EMBODIMENTS

Six embodiments of the present invention will be described below in detail.

First Embodiment

Figure 1:
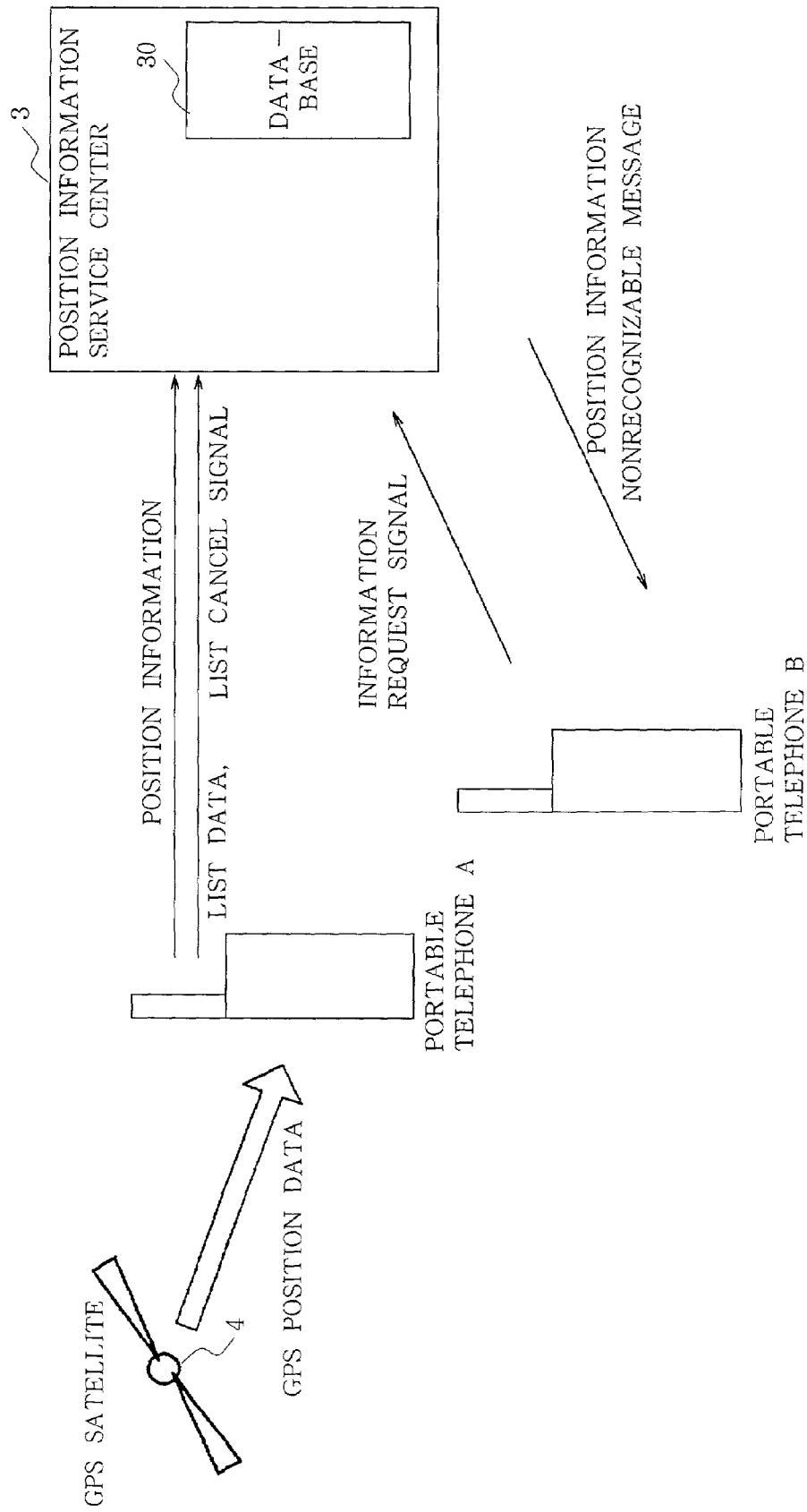
FIG. 1 is a block diagram showing the overall construction of a position information providing system of first and second embodiments.

With reference to FIG. 1 showing a position information providing system of this embodiment, both a portable telephone A and a portable telephone B can be connected to a position information service center 3 via a base station (not shown).

The portable telephone A has a GPS position measuring function, receives GPS position data transmitted from a GPS satellite 4, and prepares position information comprising the latitude and longitude of its own position based on the received position data. The position data prepared is supplied to the service center 3 via the base station (not shown).

The position information service center 3 is provided with a server (not shown). The position information supplied to the center 3 as described above is stored in a database 30 provided in the server, along with information identifying the portable telephone A, e.g., the telephone number.

With the position information providing system of the present embodiment, the person carrying the telephone A inputs to her or his telephone the telephone numbers of portable telephones of persons to whom he does not want to have his own current position known and thereafter prepares a list. When this procedure is performed, a position nonrecognizable list to be described later is prepared based on the telephone number or numbers input. The data on this list is supplied from the telephone A to the service center 3 via the base station. The list data is registered in the database 30 at the service center 3.

When an information request signal requesting to provide position information as to the telephone A is supplied from a portable telephone B to the service center 3 via the base station, the center 3 checks whether the password contained in the information request signal matches the password of the telephone A. When the two passwords are found to match, an inquiry is further made as to whether the list data of the telephone A is registered in the database 30. If the answer is negative, the position information as to the telephone A is supplied from the service center 3 to the telephone B. If the answer is affirmative, a further inquiry is made as to whether the telephone number of the telephone B is included in the list data. The position information as to the telephone A is supplied from the center 3 to the telephone B if the number of the telephone B is not included in the list data. In the case where the number of the telephone B is included in the list data, a position nonrecognizable message to the effect that the position information as to the telephone A can not be provided is sent from the center 3 to the telephone B.

Further when a list cancel signal is supplied from the telephone A to the service center 3, the center 3 cancels the registration of the list data of the telephone A.

Figure 2:
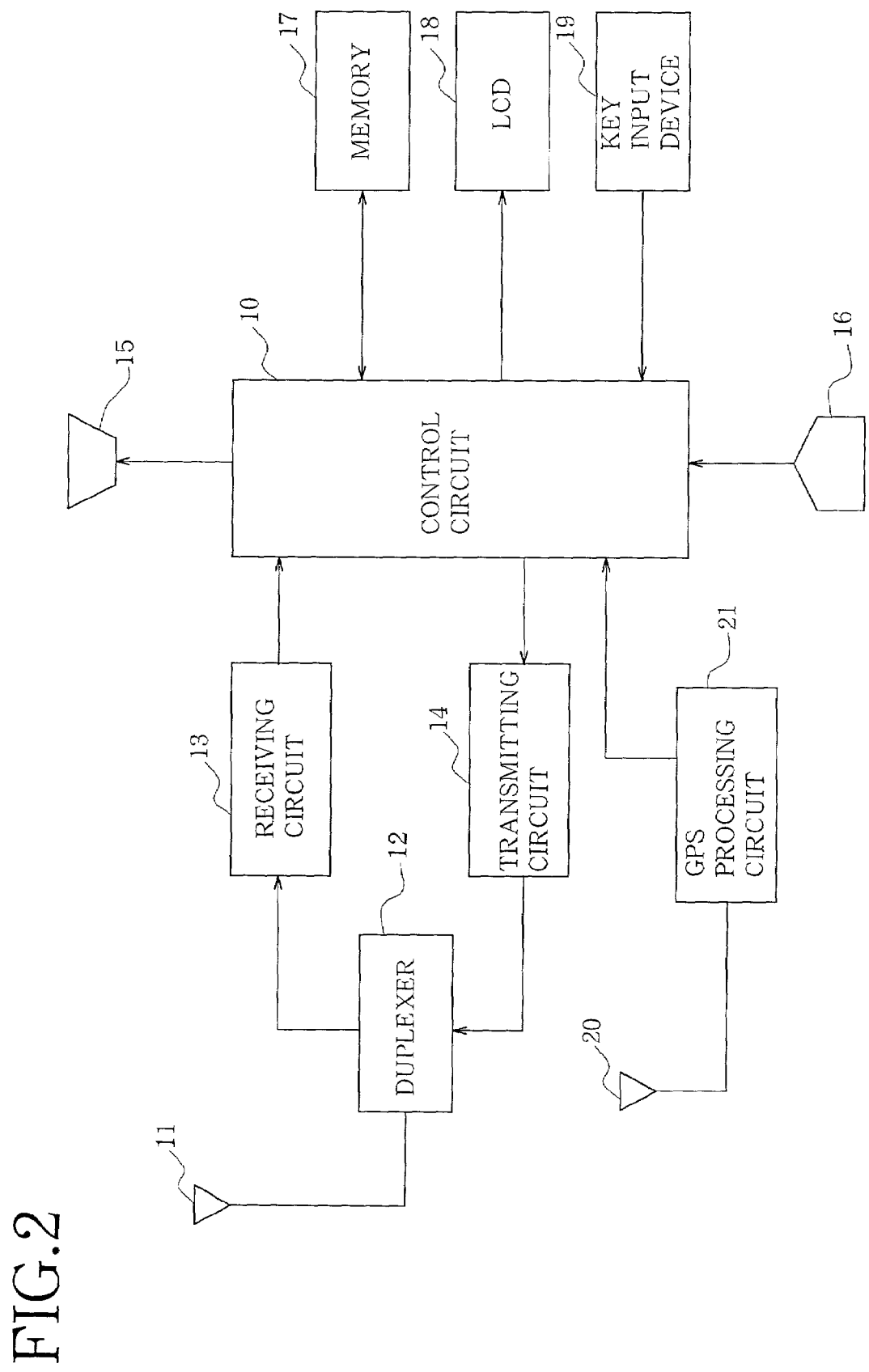
FIG. 2 is a block diagram showing the construction of a portable telephone A of the present invention.

FIG. 2 shows the construction of the portable telephone A. As illustrated, a receiving circuit 13 and a transmitting circuit 14 are connected in parallel to a duplexer 12. The signal received by the antenna 11 of the telephone is fed via the duplexer 12 to the receiving circuit 13 and demodulated to an incoming speech signal. The speech signal is fed to a speaker 15 via a control circuit 10 and produced as voice. The outgoing speech signal produced by a microphone 16 is fed through the control circuit 10 to the transmitting circuit 14 and modulated. The modulated outgoing speech signal is fed to the duplexer 12 and transmitted from the antenna 11.

Connected to the control circuit 10 are a memory 17 for storing various items of data such as telephone numbers and incoming mails, an LCD (liquid-crystal display) 18 for displaying such data and a key input device 19 comprising a plurality of manual keys.

The signal received by a GPS antenna 20 is supplied to a GPS processing circuit 21, which measures the latitude and longitude of its own position based on the received signal, current time, etc. and supplies the measurements to the control circuit 10. The control circuit 10 prepares position information from the latitude and longitude included in the measurements. The position information prepared is fed to the transmitting circuit 14, modulated, fed to the duplexer 12 and then transmitted from the antenna 11.

Figure 4:
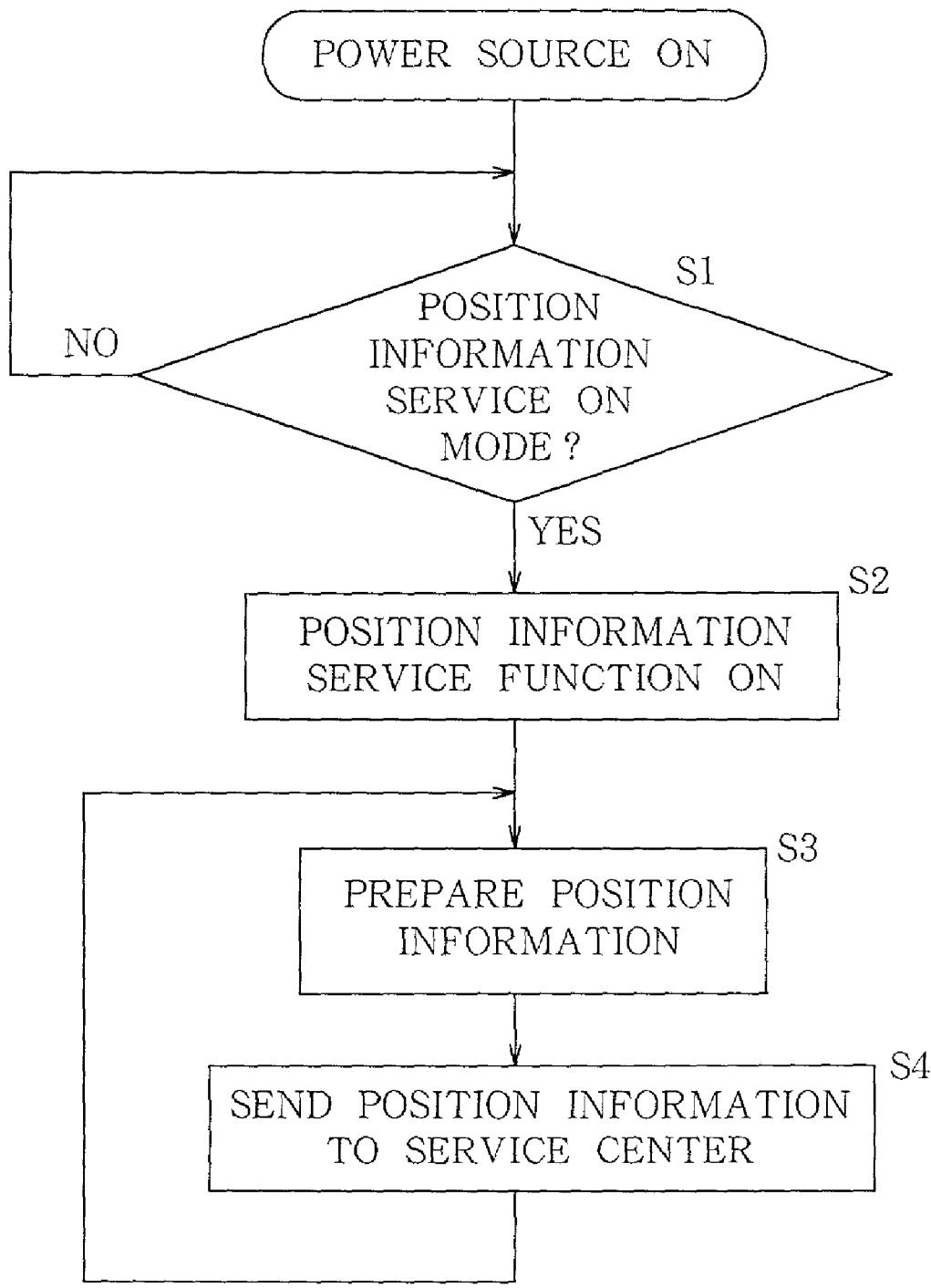
FIG. 4 is a flow chart showing the position information transmission control procedure to be performed by the control circuit of the portable telephone A of the first embodiment.

FIG. 4 shows the position information transmission control procedure to be executed by the control circuit 10 of the telephone A. When the power source of the telephone body is turned on, an inquiry is first made in step SI as to whether a position information service on mode is selected. If the answer is negative, the same inquiry of step Si is repeated, while if the answer is affirmative, step S2 follows to actuate a position information service function. Subsequently in step S3, position information is prepared from the latitude and longitude included in the measurements obtained from the GPS processing circuit 21, and the position information prepared is transmitted to the position information service center 3 in step S4, followed by step S3 again.

Position information is prepared periodically by the above procedure, and the position information is sent to the service center 3 every time the information is prepared.

Figure 5:
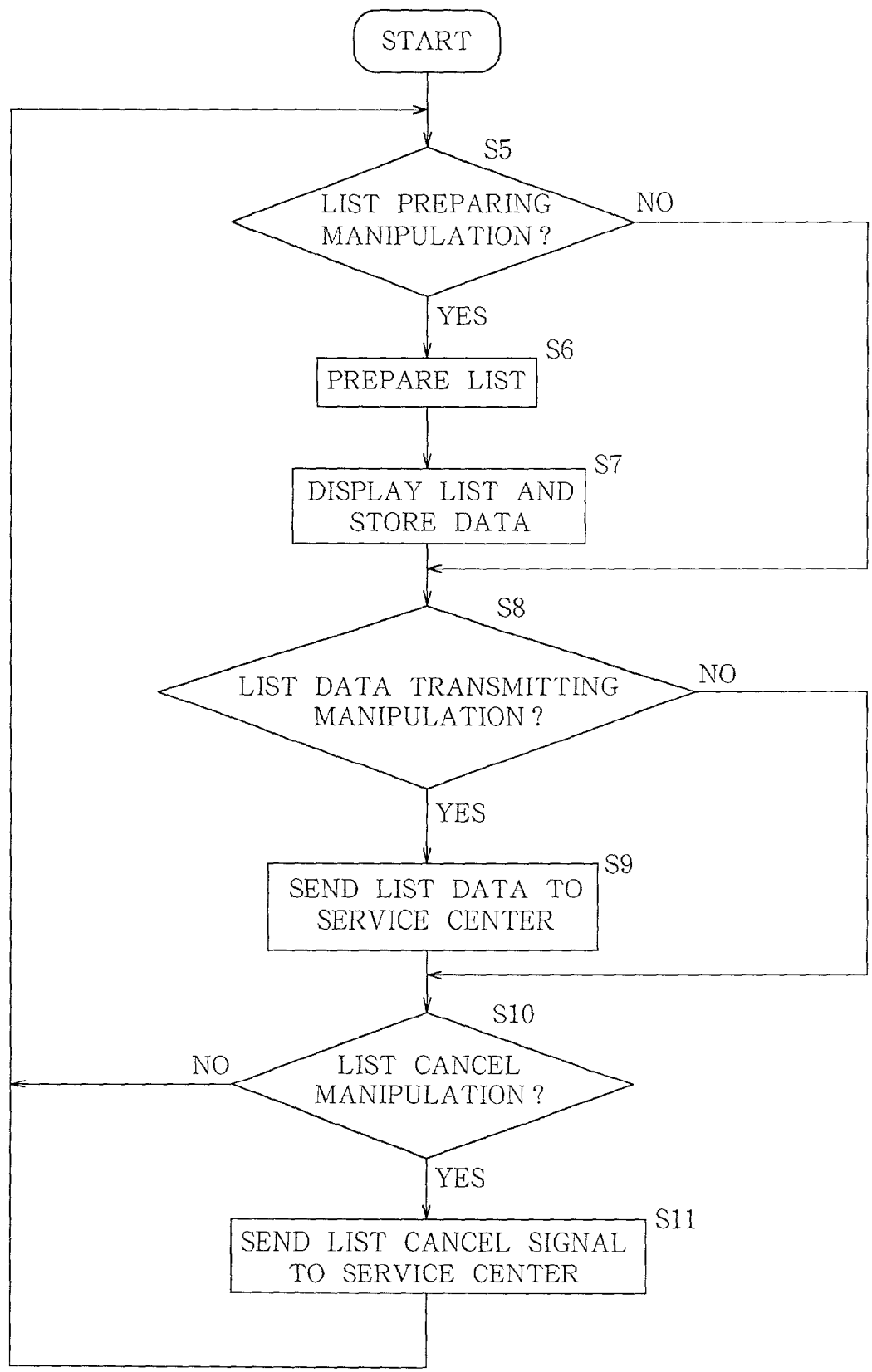
FIG. 5 is a flow chart showing the list data processing procedure to be performed by the control circuit.

FIG. 5 shows the list data processing procedure to be executed by the control circuit 10 of the portable telephone A. As illustrated, step S5 inquires first whether a list preparing manipulation is performed. If the person carrying the telephone A inputs one or a plurality of numbers of portable telephones and then performs a list preparing manipulation, the inquiry is answered in the affirmative. Step S6 then follows to prepare a position nonrecognizable list with reference to the telephone numbers input, followed by step S7 in which the list prepared is displayed on the screen of the LCD 18 as shown in FIG. 3, and the data on the list is stored in the memory 17.

An inquiry is then made in step S8 as to whether a list data transmitting manipulation is performed. When the answer is affirmative, step S9 follows in which the list data and number data representing the telephone number of its own in the memory 17 are sent to the service center 3. Step S10 then follows. If the answer to the inquiry of step S8 is negative, step S9 is detoured to perform step S10.

An inquiry is made in step S10 as to whether a list cancel manipulation is performed. If the answer is negative, the sequence returns to step S5, while if the answer is affirmative, step S11 follows to transmit a list cancel signal and number data representing the number of the telephone of its own to the service center 3. Step S5 then follows again.

Figure 3:
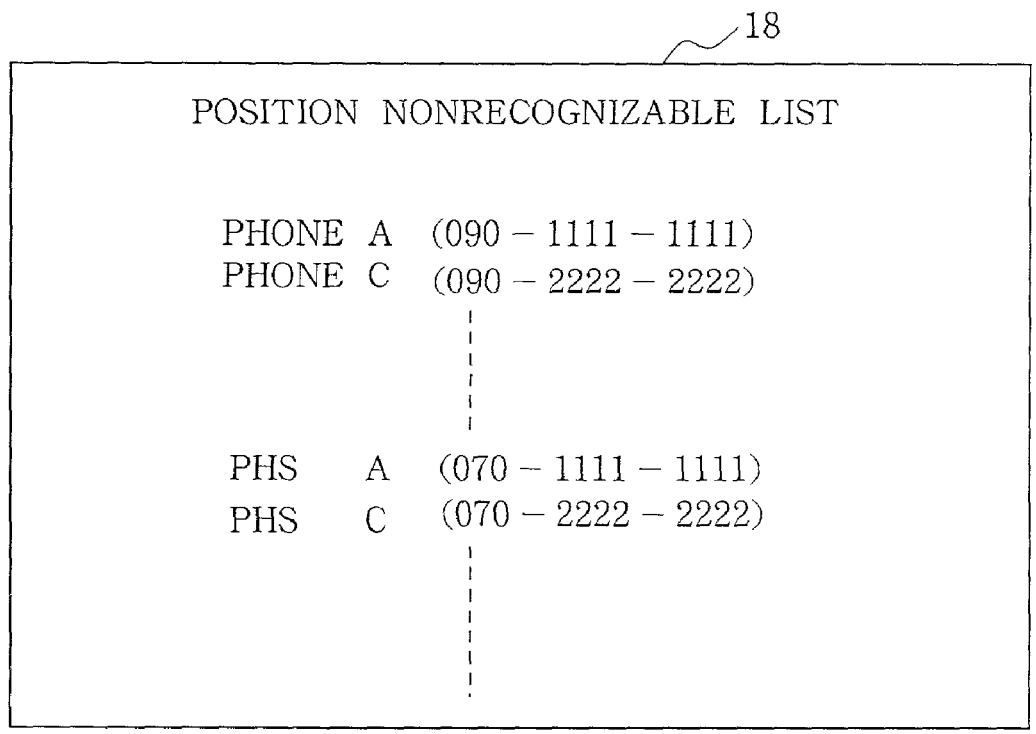
FIG. 3 is a diagram showing a list presented on the screen of a display of the portable telephone.

Thus, when the list preparing manipulation is performed, the position nonrecognizable list is prepared, the list prepared is thereafter displayed on the screen of LCD 18 as seen in FIG. 3, and the data on the prepared list is stored in the memory 17 by the procedure described.

Further when the list transmitting manipulation is performed, the list data and the number data as to the portable telephone A are sent to the service center 3, while when the list cancel manipulation is performed, a list cancel signal and number data as to the telephone A are sent to the center 3.

Figure 6:
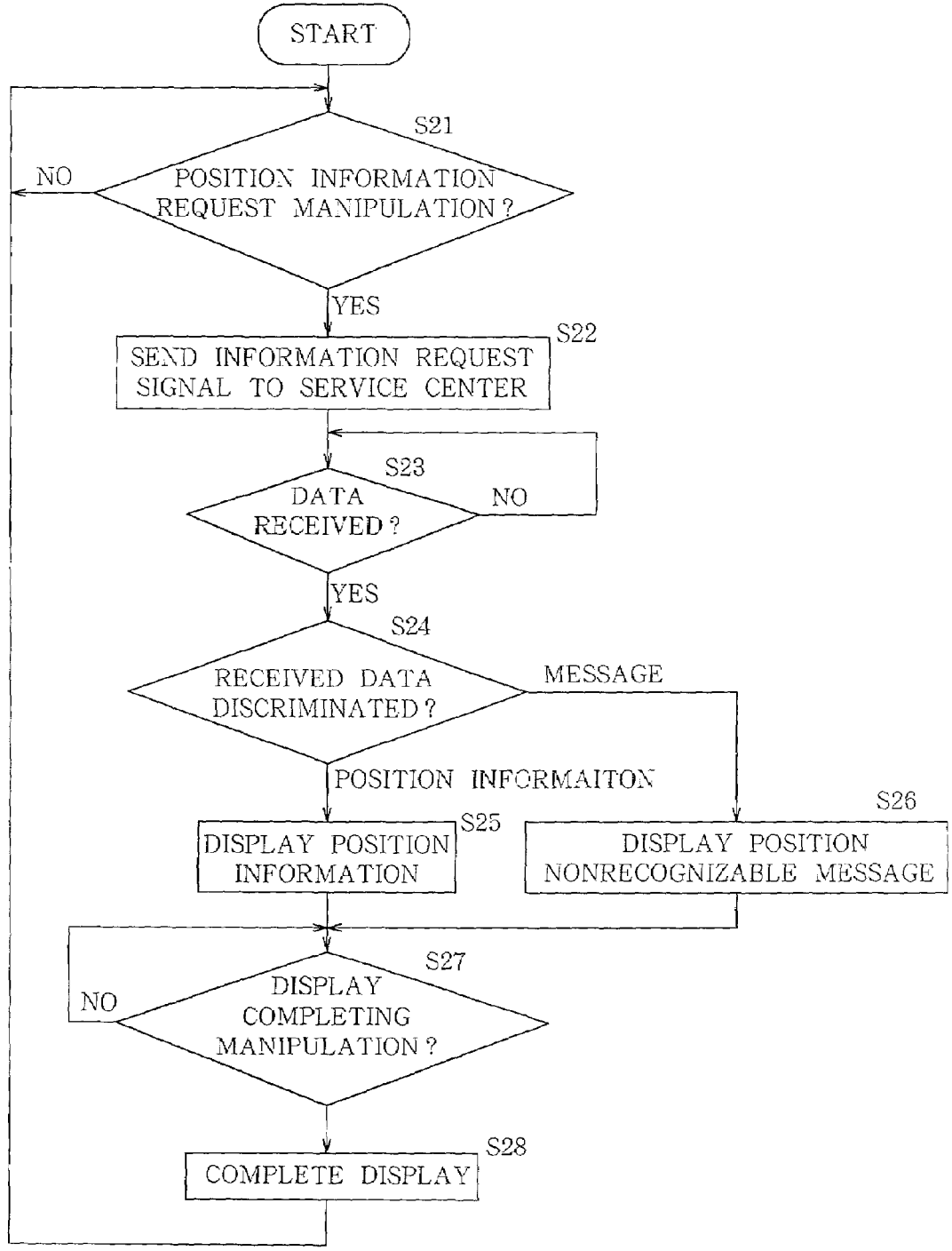
FIG. 6 is a flow chart showing the position information acquisition control procedure to be executed by a portable telephone B of the first embodiment.

FIG. 6 shows the position information acquisition control procedure to be executed by the telephone B. As illustrated, an inquiry is made first in step S21 as to whether a position information request manipulation is performed. If the answer is negative, the same inquiry of step S21 is repeated, while if the position information request manipulation is performed after the person carrying the telephone B inputs the telephone number and password of one portable telephone, the inquiry of step S21 is answered in the affirmative. Step S22 then follows to transmit an information request signal to the service center 3. The information request signal contains the number data representing the input telephone number, the password data representing the input password, and the number data representing the telephone number of its own.

An inquiry is thereafter made in step S23 as to whether some data is received. If the answer is negative, the same inquiry of step S23 is repeated, while if the answer is affirmative, step S24 follows to discriminate the received data. When the received data is position information, the position information is presented on the display in step S25, while if the received data is a position nonrecognizable message, the message is displayed in step S26. In the next step S27, an inquiry is made as to whether a display completing manipulation is performed. If the answer is negative, the inquiry of step S27 is repeated, while if the answer is affirmative, step S28 follows to complete the display. The sequence then returns to step S21.

Thus, when the position information request manipulation is performed in the above procedure, the information request signal is sent to the service center 3. When the position information is thereafter received, the information is displayed, while if the position nonrecognizable message is received, the message is displayed. When the display completing manipulation is performed with the information or message displayed, the display is completed.

Figure 7:
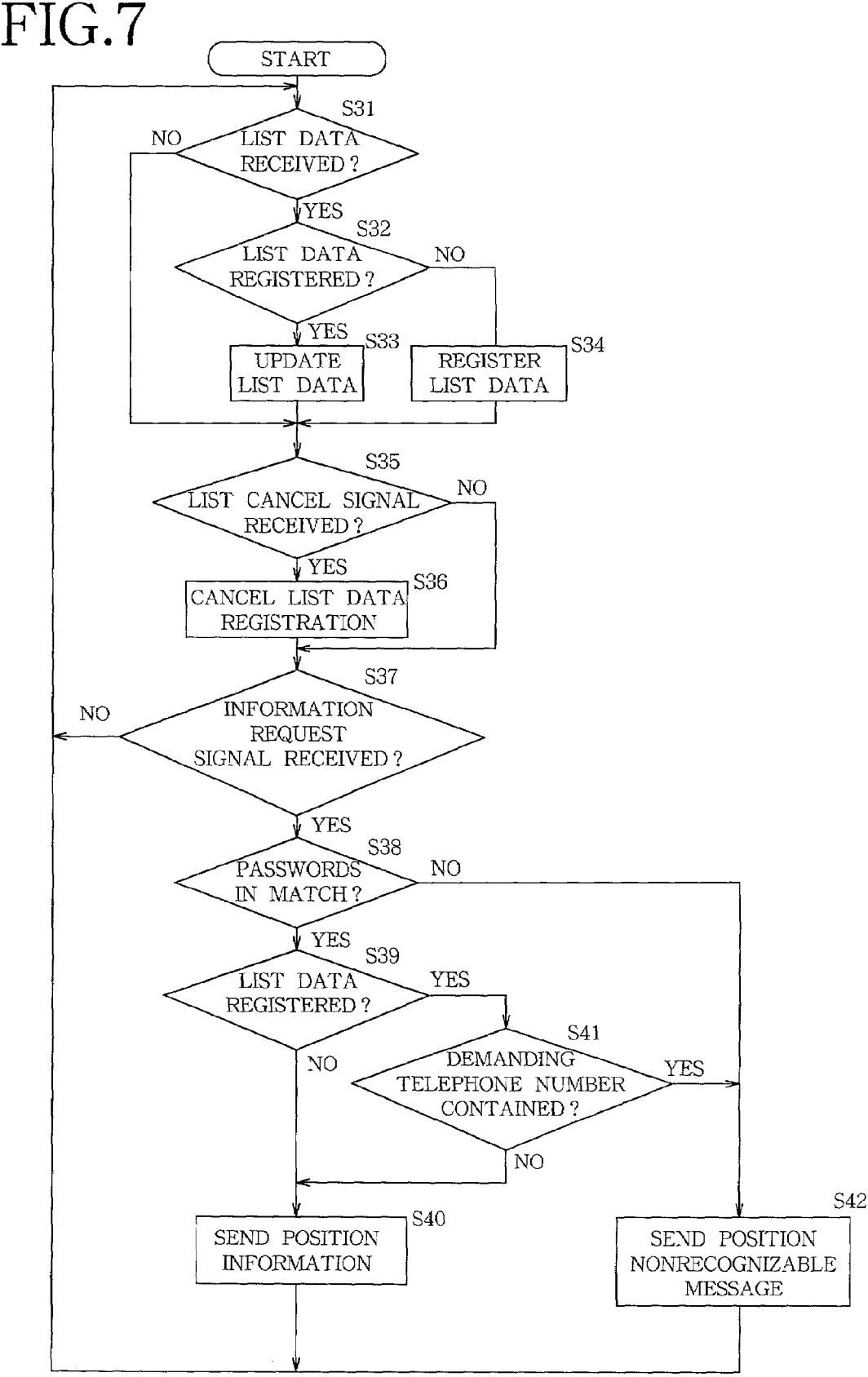
FIG. 7 is a flow chart showing the position information provision control procedure to be executed by a server installed in a position information service center of the first and second embodiments.

FIG. 7 shows the position information providing procedure to be executed by the server installed in the service center 3. As illustrated, an inquiry is made first in step S31 as to whether a list data is received. If the answer is negative, step S35 follows, whereas if the answer is affirmative, step S32 follows to inquire whether the list data of the telephone which is the transmitter of the list data is registered in the database 30 with reference to the number data which is received along with the list data. When the answer is affirmative, the registered list data is updated with the received list data. Step S35 then follows. If the answer is negative, the received list data is registered in the database 30 anew, followed by step S35.

An inquiry is made in step S35 as to whether a list cancel signal is received. When the answer is affirmative, step S36 follows to cancel the registration of the list data of the telephone which is the transmitter of the list cancel signal with reference to the number data which is received along with the list cancel signal. Step S37 then follows. On the other hand, if the answer to the inquiry of step S35 is negative, step S36 is detoured for step S37 to follow.

An inquiry is made in step S37 as to whether an information request signal is received. Step S31 follows again if the answer is negative, while if the answer is affirmative, step S38 follows to inquire whether the password data contained in the request signal is in match with the password data as to a telephone (hereinafter referred to as the "demanded telephone") of which is required the provision of position information. If the answer is found negative, a position nonrecognizable message is sent to the telephone having a telephone number represented by the self number data contained in the request signal, i.e., to the telephone requesting the position information (hereinafter referred to as the "demanding telephone"). Step S31 then follows again.

If the answer to the inquiry of step S38 is answered in the affirmative, on the other hand, step S39 follows to inquire whether the list data of the demanded telephone is registered, with reference to the number data relating to the demanded telephone and contained in the request signal. When the answer is negative, step S40 follows in which the position information as to the demanded telephone is transmitted to the demanding telephone. Step S31 thereafter follows again.

In the case where the list data of the demanded telephone is registered, the sequence proceeds to step S41 to inquire whether the telephone number of the demanding telephone is included in the list data of the demanded telephone. When the answer is negative, the position information as to the demanded telephone is sent to the demanding telephone. Step S31 thereafter follows. On the other hand, if the answer is affirmative, a position nonrecognizable message is sent to the demanding telephone, followed by step S31.

The procedure described can be summarized as follows. When the list data is received and if the list data of the portable telephone which is the transmitter of the list data is already registered, the registered list data is updated with the received list data. If the list data of the telephone is not registered, the received list data is registered anew. When a list cancel signal is thereafter received, the registration of the list data of the telephone which is the transmitter of the list cancel signal is cancelled.

Further the position information as to the demanded telephone is sent to the demanding telephone when the information request signal is received, in the case where the password contained in the signal matches the password of the demanded telephone and if the list data of the demanded telephone is not registered, or if the telephone number of the demanded telephone is not included in the list data although the list data is registered.

On the other hand, a position nonrecognizable message is sent to the demanding telephone in the case where the password contained in the information request signal is not in match with the password of the demanded telephone, or in the case where the telephone number of the demanding telephone is included in the registered list data of the demanded telephone.

When the person carrying the portable telephone A in the position information providing system of the present embodiment has a time zone during which the person does not want to have her or his current position known, for example, to the person carrying a portable telephone B, a list preparing manipulation is performed after the telephone number of the telephone B is input. When this manipulation is performed, a position nonrecognizable list is prepared, the list is then displayed on the screen of the LCD 18 as shown in FIG. 3, and the data on the list is stored in the memory 17.

The person carrying the telephone A thereafter performs a list transmitting manipulation upon arrival of the time when he does not want to have his current position known to the person carrying the telephone B. When his manipulation is made, the stored list data is sent from the telephone A to the service center 3, which receives and registers the list data.

When the person carrying the telephone B inputs the telephone number and password of the telephone A and thereafter performs a position information request manipulation in an attempt to recognize the current position of the person carrying the telephone A, an information request signal is transmitted from the telephone B to the service center 3.

Receiving this signal, the service center 3 checks whether the list data of the telephone A includes the number of the telephone B. If the number of the telephone B is found included, a position nonrecognizable message is sent to the telephone B.

The person carrying the telephone A thereafter performs a list cancel manipulation upon lapse of the time zone during which he does not like to have his current position known to the person carrying the telephone B, whereupon a list cancel signal is sent from the telephone A to the service center 3, which in turn receives the signal and cancels the registration of the list data of the telephone A. Accordingly, if the person carrying the telephone B thereafter performs a position information request manipulation in an attempt to recognize the current position of the person carrying the telephone A, the list data of the telephone A is not found registered by the center 3, which therefore sends the position information as to the telephone A to the telephone B.

In the case where the person carrying the telephone A has a time zone during which he does not like to have his current position known even to the person to whom he has told his password, he registers a list data including the numbers of portable telephones carried by persons to whom he does not want to have his current position known in the service center 3 of the position information providing system of the present embodiment during the time zone. Even if such an acquaintance then requests the service center 3 to provide the position information as to the telephone A, the position information as to the telephone A is not sent to the telephone of the acquaintance, thus obviating the likelihood that the current position of the person carrying the telephone A will be known to the acquaintance. This reliably protects the privacy of the person carrying the telephone A.

The person carrying the telephone A will thereafter perform a list cancel manipulation to cancel the registration of the list data upon lapse of the time zone during which he does not like to have his own current position known. If the above acquaintance then requests the service center 3 to provide the position information as to the telephone A, the position information as to the telephone A will be sent to the communication terminal unit of the acquaintance, enabling her or him to realize the current position of the person carrying the telephone A.

The person carrying a conventional portable telephone and having a time zone during which he does not like to have his current position known will hold the power source of the telephone body off to prevent his current position from being known to others, whereas the portable telephone of the present embodiment need not to have its power source turned off and is therefore usable during such a time zone.

Second Embodiment

The portable telephone A of the first embodiment is so adapted as to transmit list data to the position information service center in response to a list transmitting manipulation and to send a list cancel signal to the service center in response to a list cancel manipulation, whereas the portable telephone A' of this embodiment is adapted to set a list transmitting time and list cancel time as timer information, to automatically transmit list data to the position information service center upon arrival of the list transmitting time and to automatically transmit a list cancel signal to the service center upon arrival of the list cancel time.

The portable telephone A' of the present embodiment has a control circuit, which performs the same position information transmission control procedure as shown in FIG. 4 for the first embodiment, whereby the position information as to the telephone A' is periodically sent to the service center.

Figure 8:
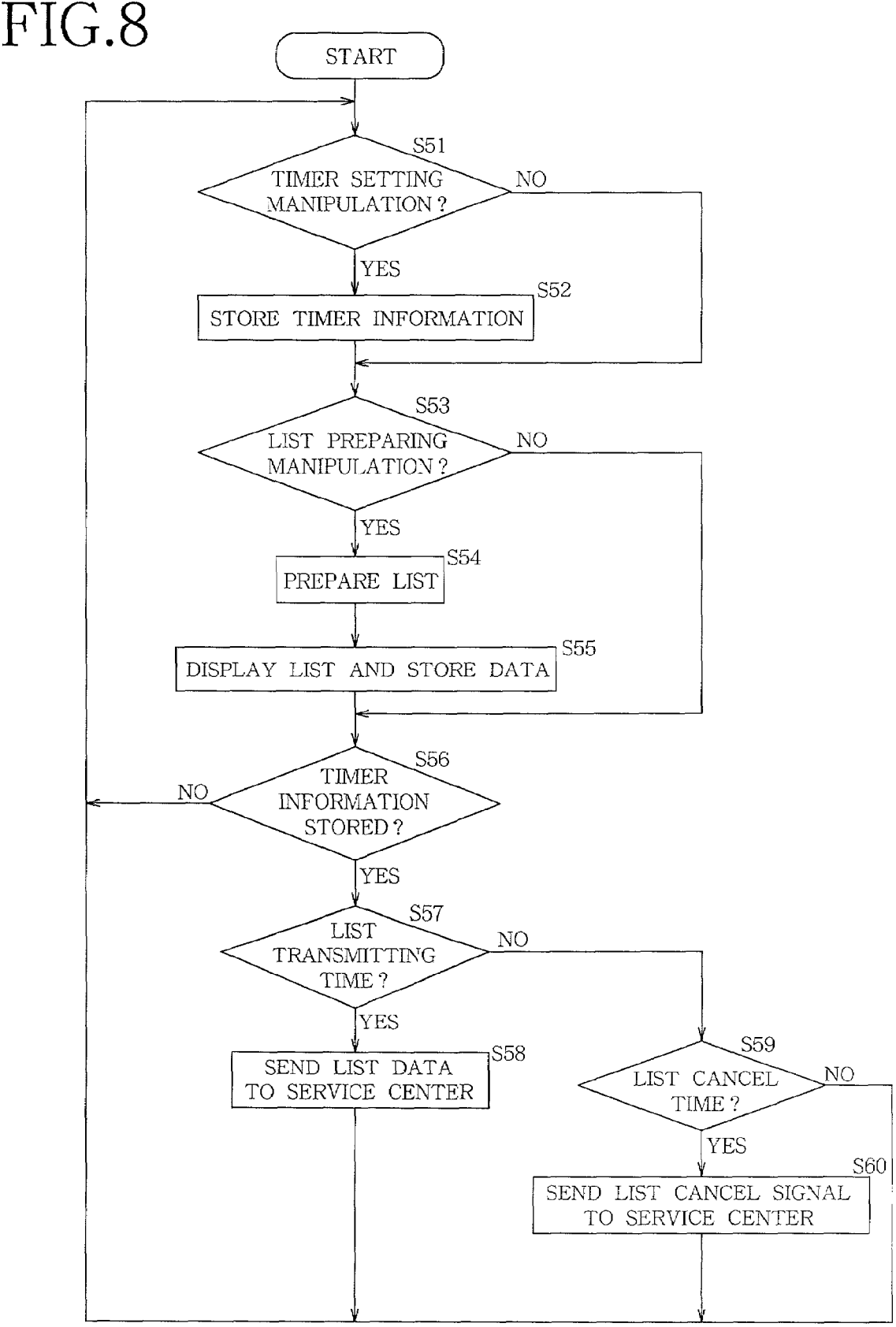
FIG. 8 is a flow chart showing the list data processing procedure to be performed by the control circuit of a portable telephone A' of the second embodiment.

FIG. 8 shows the list data processing procedure to be executed by the control circuit of the telephone A' of the present embodiment. As illustrated, an inquiry is made first in step S51 as to whether a timer setting manipulation is performed. If the person carrying the telephone A' manipulates the input device to enter a list transmitting time and list cancel time, the answer is found to be affirmative. Step S52 then follows to store the input list transmitting time and list cancel time in the memory as timer information.

An inquiry is made in the next step S53 as to whether a list preparing manipulation is performed. When the person carrying the telephone A' inputs the number or numbers of one or a plurality of portable telephones and thereafter performs a list preparing manipulation, the answer is found to be affirmative, followed by step S54 in which a position nonrecognizable list is prepared based on the input telephone numbers. The list prepared is thereafter displayed on the screen of the LCD and the data on the list is stored in the memory in step S55.

Subsequently, step S56 inquires whether the timer information is stored in the memory. Step S51 follows again if the answer is negative, whereas step S57 follows if the answer is affirmative to inquire whether the list transmitting time included in the timer information is in match with the current time. When the answer is affirmative, the list data stored in the memory is sent to the service center in step S58. Step S51 then follows again.

If the answer to the inquiry of step S57 is found to be negative, step S59 follows to inquire whether the list cancel time included in the timer information is in match with the current time. When the answer is negative, the sequence returns to step S51 again, whereas if the answer is affirmative, step S60 follows to send a list cancel signal and number data representing the telephone number of its own to the service center. The sequence then returns to step S51 again.

The procedure described is such that when the timer setting manipulation is performed, the input list transmitting time and list cancel time are stored in the memory as timer information. Further when the list preparing manipulation is performed, a position nonrecognizable list is prepared, and the list is displayed on the screen of the LCD and the data on the prepared list is stored in the memory.

Further upon arrival of the list transmitting time, the list data and the number data as to the telephone A' are sent to the service center. Upon arrival of the list cancel time, a list cancel signal and the number data as to the telephone A' are sent to the service center.

In the case where the person carrying the telephone A' of the position information providing system of the present embodiment has a time zone during which he does not want to have his current position known, for example, to the person carrying a portable telephone B, the start time of the time zone is input as the list transmitting time, and the termination time of the zone as the list cancel time. The list transmitting time and list cancel time thus input are stored in the memory as timer information.

As is the case with the first embodiment, the person carrying the telephone A' performs a list preparing manipulation after inputting the number of the telephone B. A position nonrecognizable list is then prepared, the list is displayed on the screen of the LCD and the data on the list is stored in the memory.

Subsequently, upon arrival of the list transmitting time, the stored list data is transmitted from the telephone A' to the service center, which in turn receives and registers the list data. Accordingly, even if the person carrying the telephone B performs a position information request manipulation to recognize the current position of the person carrying the telephone A', the number of the telephone B is interpreted as being included in the list data of the telephone A' by the service center, with the result that a position nonrecognizable message is sent to the telephone B.

Thereafter, upon arrival of the list cancel time, a list cancel signal is sent from the telephone A' to the service center, which in turns receives the signal and cancels the registration of the list data of the telephone A'. If the person carrying the telephone B thereafter performs a position information request manipulation in an attempt to recognize the current position of the person carrying the telephone A', the list data of the telephone A' is not interpreted as being registered by the service center, which therefore transmits the position information as to the portable telephone A' to the telephone B.

Third Embodiment

As described above, the position information as to the portable telephone is periodically sent from the telephone to the position information service center, which in turn updates the position information stored in the database every time position information is received. With the position information providing system of this embodiment, an inquiry is made as to whether the position information stored in the database of the service center was updated with a specified period of time in the past, and the position information as to the demanded telephone or a position nonrecognizable message is sent to the demanding telephone depending on the result of inquiry.

The portable telephone A" of this embodiment is alternatively settable in a GPS position measuring function on or off state, and can be set for a position measuring function off time and a position measuring function on time as timer information. The GPS position measuring function is set in an off state upon the arrival of the function off time and in an on state upon the arrival of the function on time.

Figure 9:
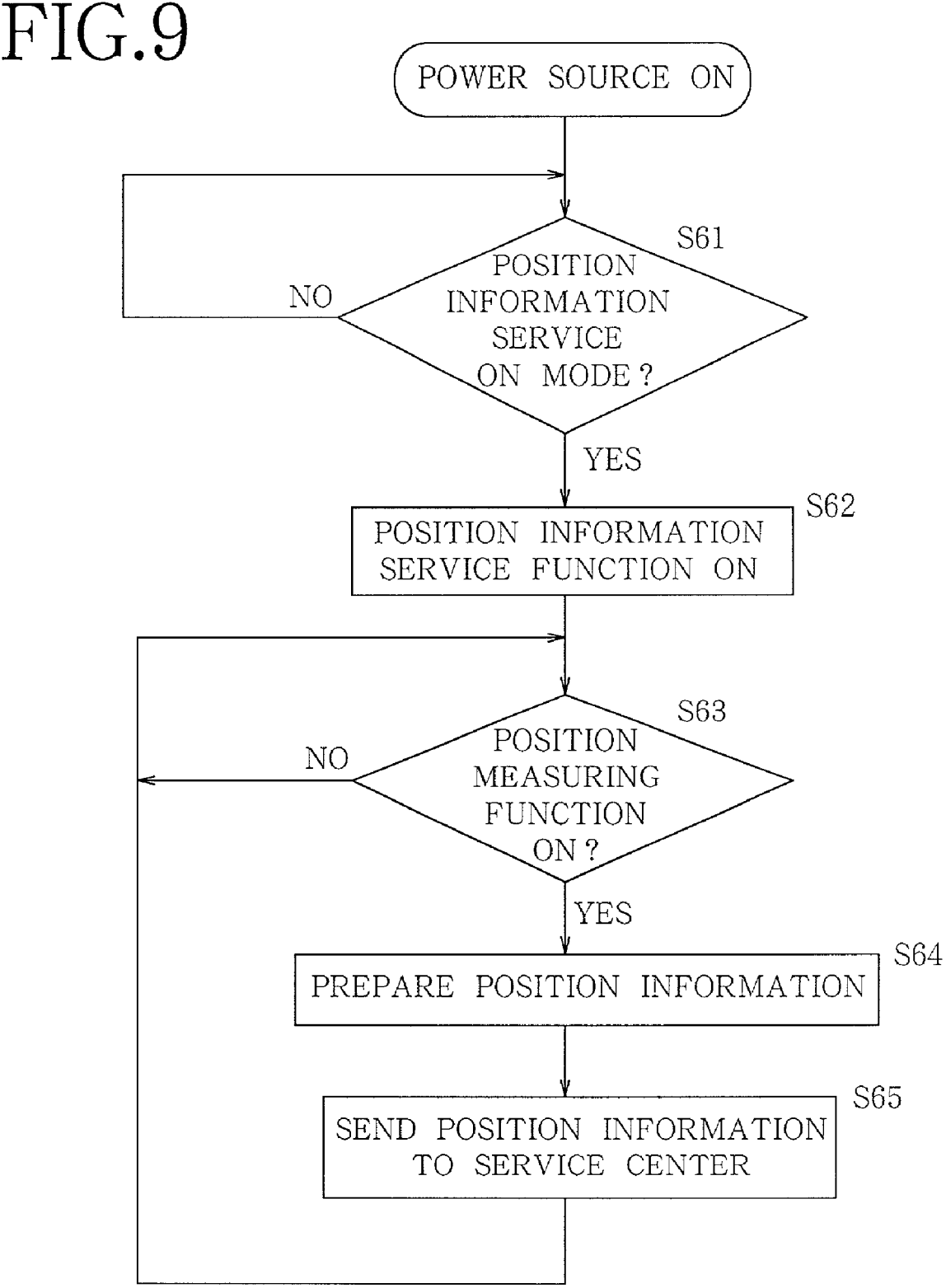
FIG. 9 is a flow chart showing the position information transmission control procedure to be performed by the control circuit of a portable telephone A" of a third embodiment.

FIG. 9 shows the position information transmission control procedure to be executed by the control circuit of the portable telephone A" of the present embodiment. When the power source of the telephone body is turned on, an inquiry is made first in step S61 as to whether a position information service on mode is selected as illustrated. When the answer is negative, the same inquiry of step S61 is repeated. If the answer is affirmative, on the other hand, step S62 follows to set a position information service function on. Subsequently in step S63, an inquiry is made as to whether the GPS position measuring function is set on. When the answer is negative, the same inquiry of step S63 is repeated, while if the answer is affirmative, step S64 follows to prepare position information from the latitude and longitude included in the measurements obtained from the GPS processing circuit. The position information prepared is thereafter transmitted to the position information service center in step S65, whereupon the sequence returns to step S63.

The procedure described is so designed that when the GPS position measuring function is on, position information is periodically prepared, and that the information is sent to the service center every time it is prepared.

Figure 10:
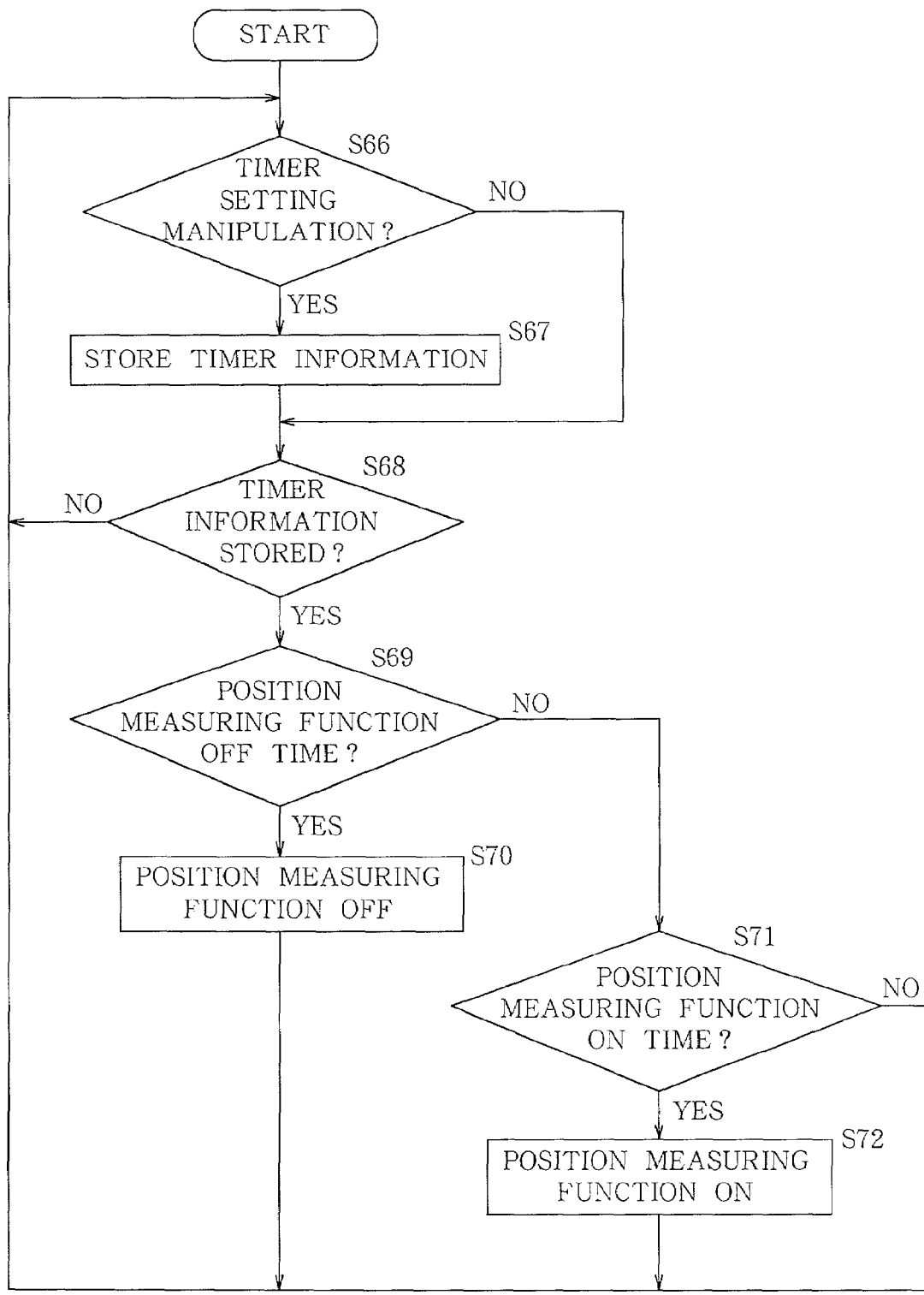
FIG. 10 is a flow chart showing the position measuring function on/off control procedure to be performed by the control circuit.

FIG. 10 shows the GPS position measuring function on/off control procedure to be executed by the control circuit of the portable telephone A". As illustrated, an inquiry is made first in step S66 as to whether a timer setting manipulation is performed. When the person carrying the telephone A" manipulates the input device to enter a position measuring function off time and a position measuring function on time, the answer is found to be affirmative, followed by step S67 to store the function off time and on time input in the memory as timer information.

Subsequently in step S68, an inquiry is made as to whether the timer information is stored in the memory. If the answer is negative, step S66 follows again, whereas if the answer is affirmative, step S69 follows to inquire whether the position measuring function off time included in the timer information is in match with the current time. When the answer is affirmative, step S70 follows to set the GPS position measuring function off. The sequence then returns to step S66.

If the answer to the inquiry of step S69 is negative, step S71 follows to inquire whether the position measuring function on time included in the timer information is in match with the current time. When the answer is negative, the sequence returns to step S66, while if the answer is affirmative, the GPS position measuring function is set on in step S72, followed by step S66 again.

When the timer setting manipulation is performed according to the procedure described, the position measuring function off time and on time input are stored in the memory as timer information.

Subsequently, upon arrival of the position measuring function off time, the GPS position measuring function is set off, while upon arrival of the position measuring function on time, the GPS position measuring function is set on.

Figure 11:
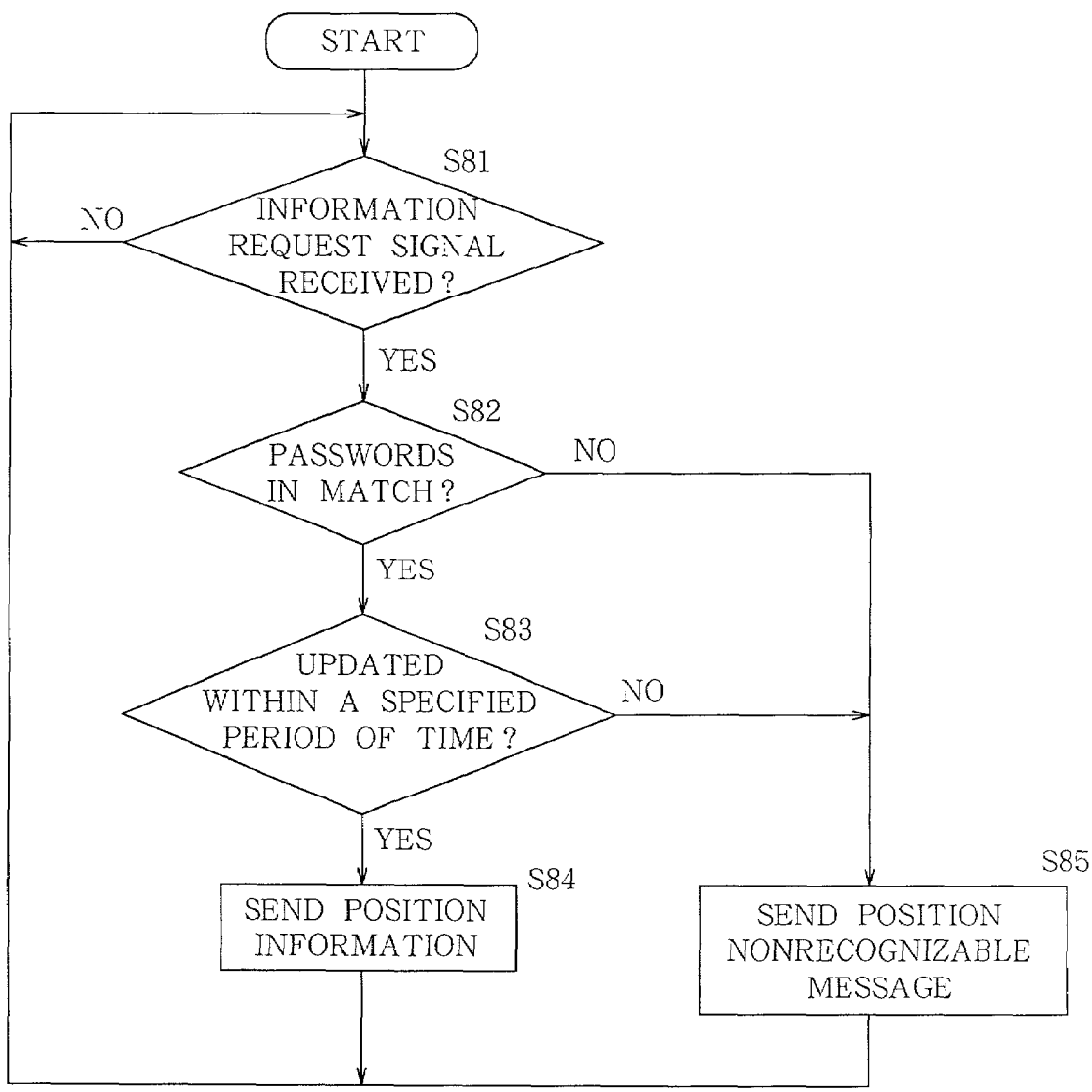
FIG. 11 is a flow chart showing the position information provision control procedure to be performed by a computer installed in a position information service center of the third embodiment.

FIG. 11 shows the position information provision control procedure to be executed by a server installed in the position information service center of the present embodiment. As illustrated, an inquiry is made first in step S81 as to whether an information request signal is received. When the answer is negative, the same inquiry of step S81 is repeated, whereas if the answer is affirmative, step S82 follows to inquire whether the password data contained in the information request signal is in match with the password data of the demanded telephone. If the answer is negative, a position nonrecognizable message is sent to the demanding telephone, and the sequence then returns to step S81.

When the inquiry of step S82 is answered in the affirmative, on the other hand, step S83 follows to inquire whether the position information as to the demanded telephone was updated within a specified period of time in the past, e.g., within 5 minutes in the past. When the answer is affirmative, step S84 follows to send the position information as to the demanded telephone to the demanding telephone. Step S81 thereafter follows again. If the answer is negative, on the other hand, step S85 follows to send a position nonrecognizable message to the demanding telephone, followed by step S81 again.

When the information request signal is received in the procedure described, the position information of the demanded telephone is sent to the demanding telephone if the password contained in the signal is in match with the password of the demanded telephone and if the position information of the demanded telephone was updated within a specified period of time in the past.

When the password contained in the information request signal is not in match with the password of the demanded telephone, or if the position information as to the demanded telephone was not updated within the specified period of time in the past, a position nonrecognizable message is sent to the demanding telephone.

In the case where the person carrying the telephone A" has a time zone during which he does not want to have his current position known, for example, to the person carrying a telephone B in the position information providing system of the present embodiment, the start time of the time zone is input as the position measuring function off time and the termination time of the time zone as the position measuring function on time.

When the position measuring function off time thereafter arrives, the GPS position measuring function of the telephone A" is set off to discontinue the transmission of the position information from the telephone A" to the service center. Accordingly, even if the person carrying the telephone B thereafter performs a position information request manipulation in an attempt to recognize the current position of the person carrying the telephone A", the position information as to the telephone A" is not found to have been updated for the specified period of time in the past by the service center, which in turn transmits a position nonrecognizable message to the telephone B.

Further when the position measuring function on time thereafter arrives, the GPS position measuring function of the telephone A" is set on to resume the transmission of the position information from the telephone A" to the service center. Accordingly, if the person carrying the telephone B thereafter performs a position information request manipulation in an attempt to recognize the current position of the person carrying the telephone A", the position information as to the telephone A" is found to have been updated during the specified period of time in the past by the service center, which in turn transmits the position information as to the telephone A" to the telephone B.

Fourth Embodiment

Figure 12:
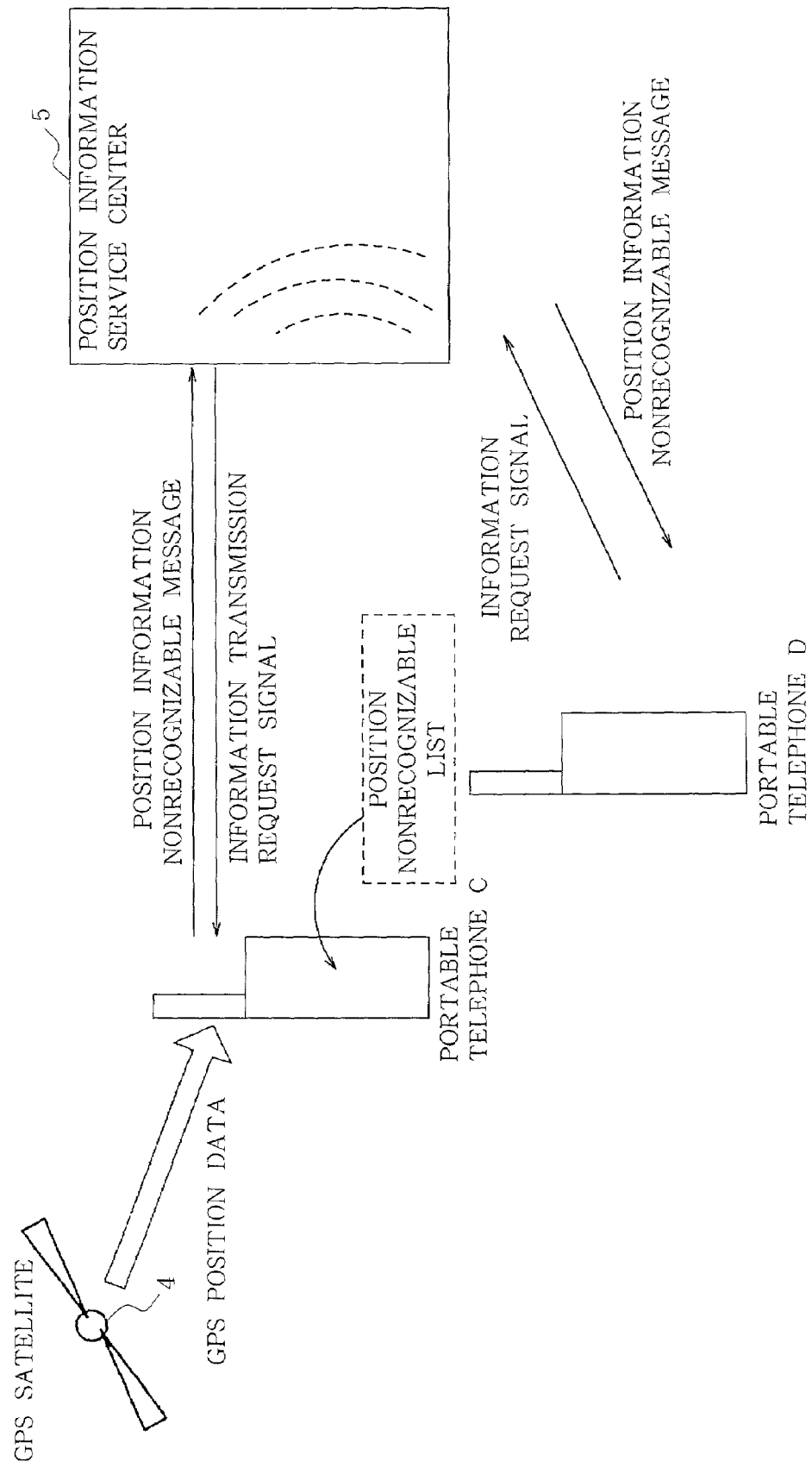
FIG. 12 is a block diagram showing the overall construction of a position information providing system of the fourth to sixth embodiments.

With reference to FIG. 12 showing a position information providing system of this embodiment, both a portable telephone C and a portable telephone D can be connected to a position information service center 5 via a base station (not shown).

The portable telephone C has a GPS position measuring function, receives GPS position data transmitted from a GPS satellite 4, and prepares position information comprising the latitude and longitude of its own position based on the received position data. The position data prepared is stored in a memory (not shown) incorporated in the telephone.

With the position information providing system of the present embodiment, the person carrying the telephone C inputs to his telephone the telephone numbers of portable telephones of persons to whom he does not want to have his own current position known. When such a telephone number or numbers are input, a position nonrecognizable list is prepared based on the telephone number or numbers input. The data on this list is stored in the memory.

When an information request signal requesting to provide position information as to the telephone C is supplied from a portable telephone D to the service center 5 via the base station, an information transmission request signal requesting the transmission of the position information is fed from the service center 5 to the telephone C. The telephone C checks whether the password contained in the information request signal matches the password of its own telephone. When the two passwords are found to match, an inquiry is further made as to whether the list data stored in the memory is valid. If the list data is invalid, the position information as to the telephone C is supplied from the telephone C to the telephone D via the base station and the service center 5. If the list data is valid, on the other hand, an inquiry is made as to whether the number of the telephone D is included in the list data. If the number of the telephone D is not included in the list data, the position information as to the telephone C is supplied from the telephone C to the telephone D via the base station and the service center 5. In the case where the number of the telephone D is included in the list data, a position nonrecognizable message to the effect that the position information as to the telephone C can not be provided is supplied from the telephone C to the telephone D via the base station and the service center 5.

Figure 13:
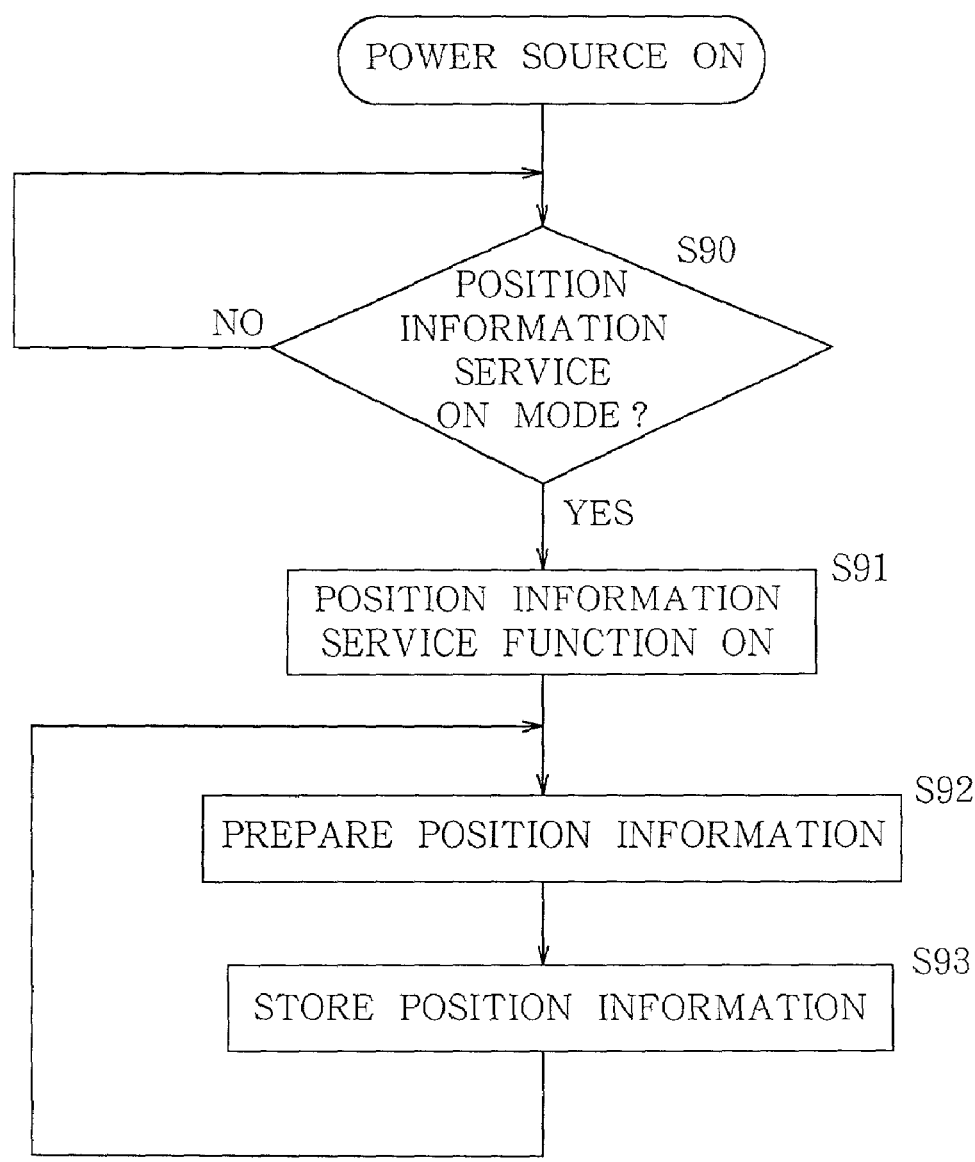
FIG. 13 is a flow chart showing the position information storage control procedure to be performed by the control circuit of a portable telephone C of the fourth embodiment.

FIG. 13 shows the position information storage control procedure to be executed by the control circuit of the portable telephone C. When the power source of the telephone body is turned on, an inquiry is made first in step S90 as to whether a position information service on mode is selected as illustrated. If the answer is negative, the same inquiry of step S90 is repeated, while if the answer is affirmative, step S91 follows to set a position information service function on. Subsequently in step S92, position information is prepared from the latitude and longitude included in the measurements obtained from the GPS processing circuit, followed by step S93, in which the position information prepared is stored in the memory. The sequence then returns to step S92.

Through the procedure described above, position information is prepared periodically, and the position information is stored in the memory every time the information is prepared.

Figure 14:
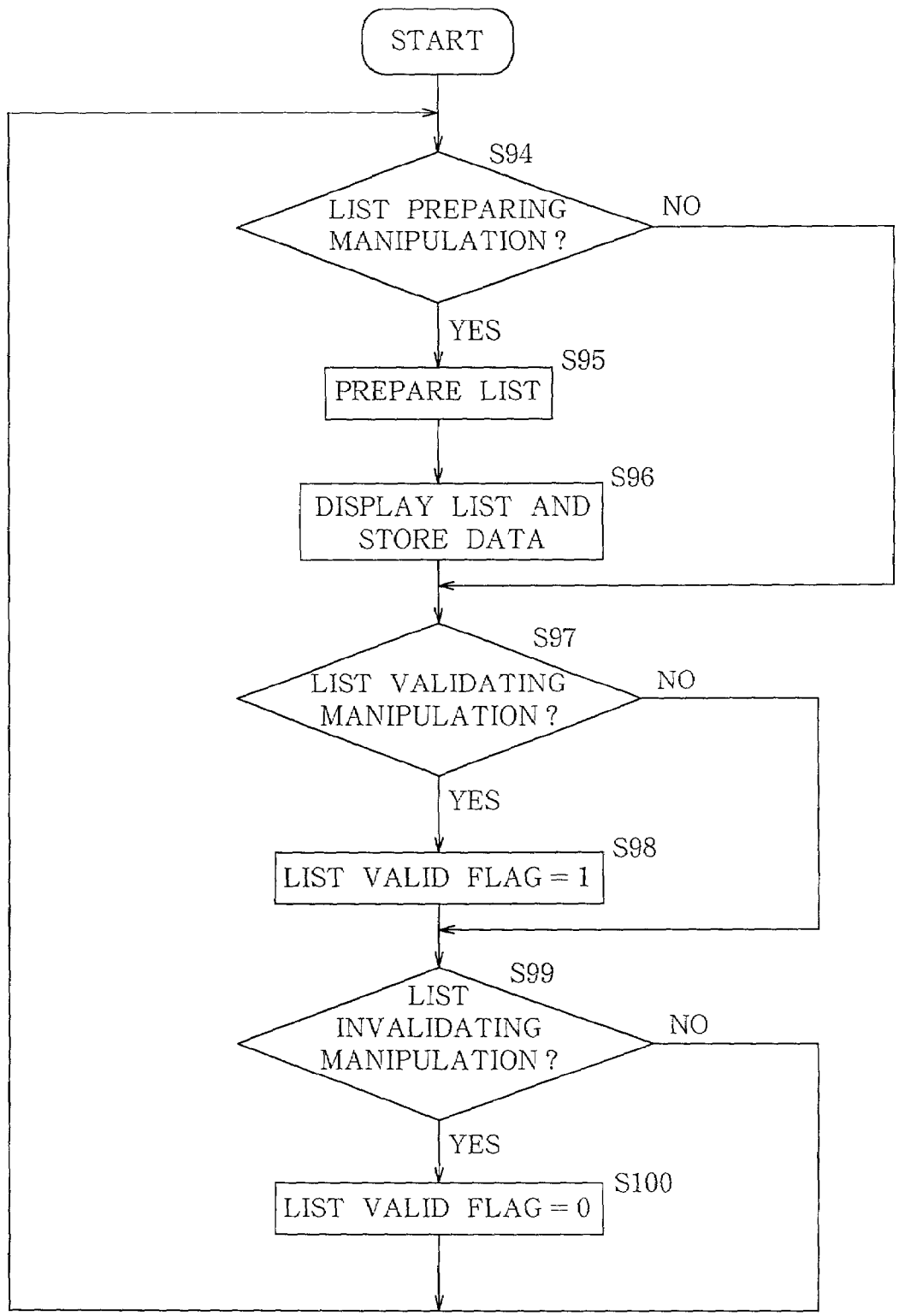
FIG. 14 is a flow chart showing the list data processing procedure to be performed by the control circuit.

FIG. 14 shows a list data processing procedure to be executed by the control circuit of the portable telephone C. As illustrated, an inquiry is made first in step S94 as to whether a list preparing manipulation is performed. When the person carrying the telephone C inputs the number or numbers of one or a plurality of portable telephones and then performs a list preparing manipulation, the answer is found to be affirmative, followed by step S95 to prepare a position nonrecognizable list based on the input telephone numbers. The list prepared is thereafter displayed on the screen of the LCD as seen in FIG. 3 and the data on the list is stored in the memory in step S96.

Subsequently in step S97, an inquiry is made as to whether a list validating manipulation is performed, and if the answer is affirmative, step S98 follows to set a valid flag to 1, indicating that the list data stored in the memory is valid. The sequence then proceeds to step S99. If the answer to the inquiry of step S97 is negative, the sequence proceeds to step S99, while detouring step S98.

Step S99 inquires whether a list invalidating manipulation is performed. When the answer is negative, the sequence returns to step S94, while if the answer is affirmative, step S100 follows to set the list valid flag at 0, followed by step S94 again.

According to the procedure described, the list preparing manipulation performed is followed by the preparation of the position nonrecognizable list. The list prepared is then displayed on the screen of the LCD, and the data on the list is stored in the memory.

The list validating manipulation is thereafter performed, whereupon the list valid flag is set at 1, while when the list invalidating manipulation is performed, the list valid flag is set at 0.

Figure 15:
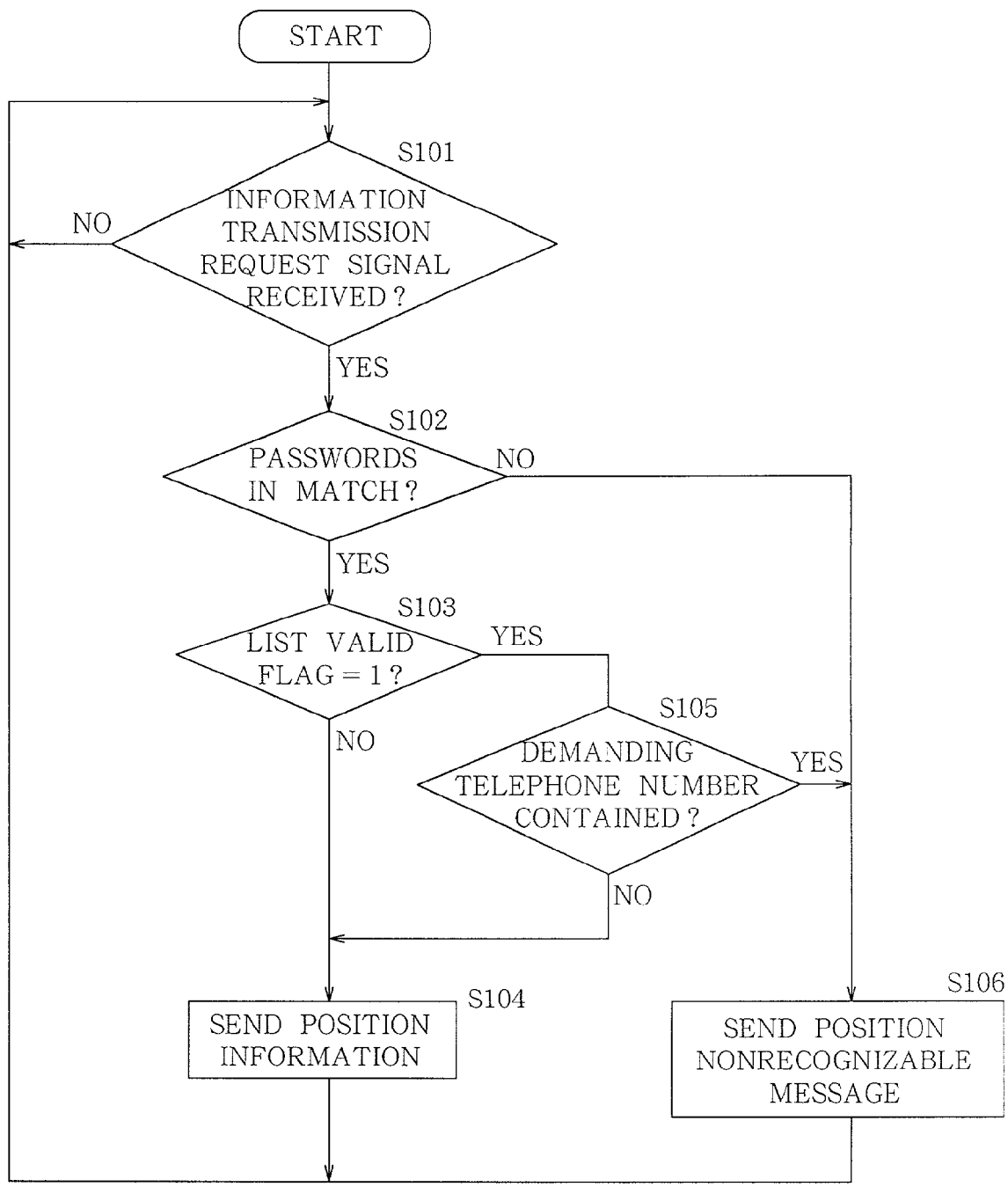
FIG. 15 is a flow chart showing the position information provision control procedure to be performed by the control circuit.

FIG. 15 shows the position information provision control procedure to be executed by the control circuit of the portable telephone C. As illustrated, an inquiry is made first in step S101 as to whether an information transmission request signal is received. If the answer is negative, the same inquiry of step S101 is repeated, while if the answer is affirmative, step S102 follows to check whether the password data contained in the request signal is in match with the password data of its own. When the answer is negative, step S106 follows to send a position nonrecognizable message to the service center 5. The sequence then returns o step S101.

In the case where the inquiry of step S102 is answered in the affirmative, on the other hand, step S103 follows to inquire whether the list valid flag is set at 1. Step S104 follows if the answer is negative to send the position information stored in the memory to the service center 5. The sequence then returns to step S101.

In the case where the list valid flag is set at 1, step S105 follows to inquire whether the number of the demanding telephone is included in the list data. If the answer is negative, step S104 follows to transmit the position information stored in the memory to the service center 5. The sequence then returns to step S101. If the answer is affirmative, on the other hand, step S106 follows to send a position nonrecognizable message to the service center 5, followed by step S101 again.

When the information transmission request signal is received in the procedure described, the position information is sent to the service center 5 when the password contained in the signal is in match with the password of its own and if the list valid flag is set at 0, or when the number of the demanding telephone is not included in the list data although the list valid flag is set at 1.

On the other hand, a position nonrecognizable message is sent to the service center if the password contained in the information transmission request signal is not in match with the password of its own, or when the list valid flag is set at 1 with the number of the demanding telephone included in the list data.

In the case where the person carrying the telephone C has a time zone during which he does not want to have his own current position known, for example, to the person carrying the telephone D in the position information providing system of the present embodiment, he inputs the number of the telephone D and thereafter performs a list preparing manipulation. When the manipulation is performed, a position nonrecognizable list is prepared, the list is displayed on the screen of the LCD as shown in FIG. 3, and the data on the list is stored in the memory.

The person carrying the telephone C thereafter performs a list validating manipulation upon arrival of the time when he does not want to have his current position known to the person carrying the telephone D. When the manipulation is performed, the list valid flag is set at 1.

When the person carrying the telephone D inputs the number and password of the telephone C and thereafter performs a position information request manipulation in an attempt to recognize the current position of the person carrying the telephone C, an information request signal is sent from the telephone D to the service center 5, which in turn transmits an information transmission request signal to the telephone C.

The telephone C receives the request signal and inquires whether the number of the telephone D is included in the list data. If the answer is affirmative, a position nonrecognizable message is sent from the telephone C to the telephone D by way of the service center 5.

The person carrying the telephone C thereafter performs a list invalidating manipulation upon the lapse of the time zone during which he does not want to have his current position known to the person carrying the telephone D. When the manipulation is performed, the list valid flag is set at 0. When the person carrying the telephone D thereafter performs a position information request manipulation in order to recognize the current position of the person carrying the telephone C, the telephone C finds the list valid flag set at 0 and transmits the position information to the telephone D via the service center.

Fifth Embodiment

The portable telephone C of the fourth embodiment is adapted to set the list valid flag at 1 in response to a list validating manipulation and to set the list valid flag at 0 in response to a list invalidating manipulation, whereas the portable telephone C' of the present embodiment is adapted to set a list validating time and list invalidating time as timer information. Thus, a list valid flag is automatically set at 1 upon arrival of the list validating time, and is automatically set at 0 upon arrival of the list invalidating time.

The control circuit of the telephone C' of the present embodiment executes the same position information storage control procedure as shown in FIG. 13 for the fourth embodiment, whereby position information is prepared periodically, and the position information is stored in the memory every time it is prepared.

Figure 16:
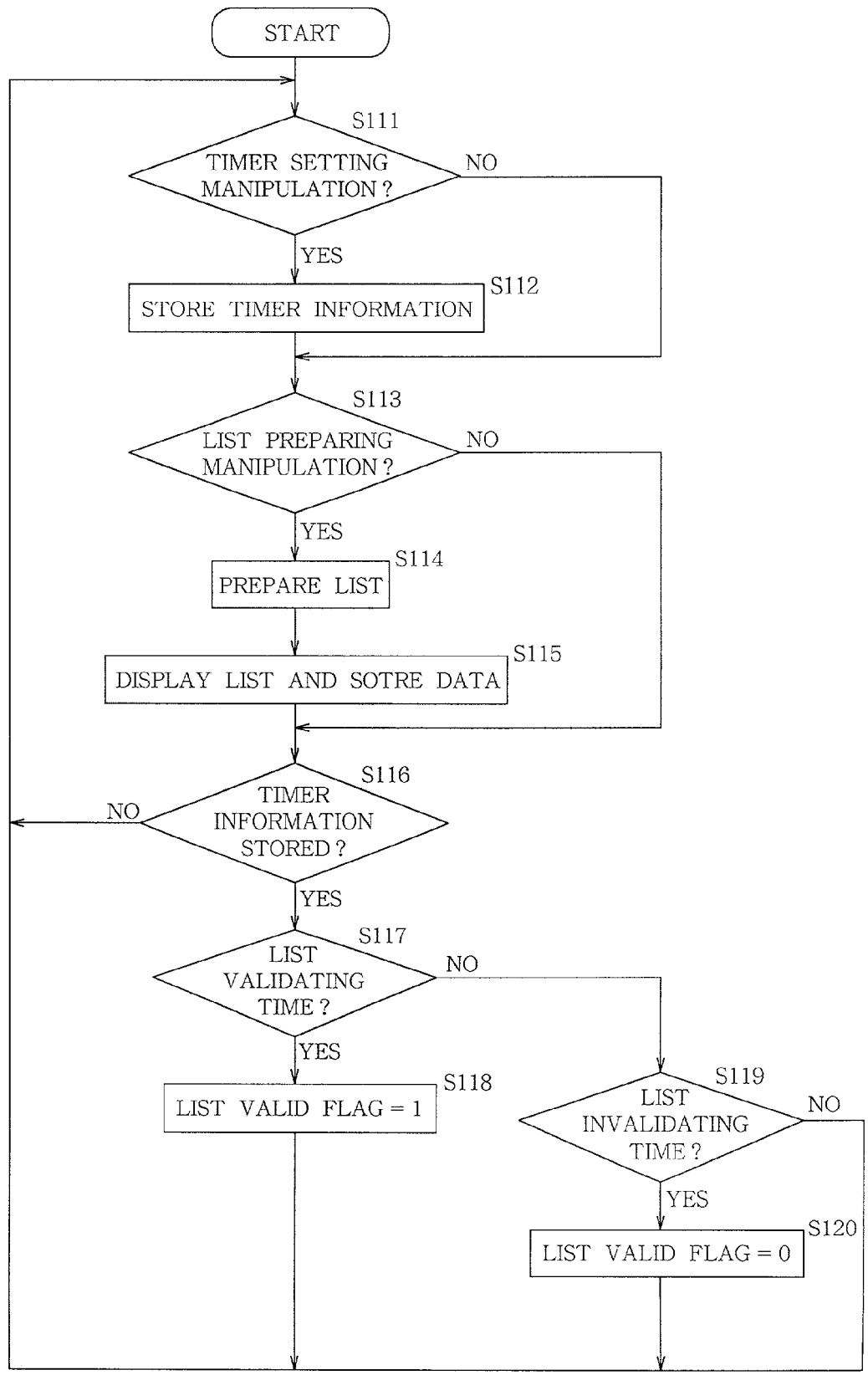
FIG. 16 is a flow chart showing the list data processing procedure to be performed by the control circuit of a portable telephone C' of the fifth embodiment.

FIG. 16 shows the list data processing procedure to be executed by the control circuit of the telephone C' of the present embodiment. As illustrated, an inquiry is made first in step S111 as to whether a timer setting manipulation is performed. When the person carrying the telephone C' manipulates the input device to enter a list validating time and list invalidating time, the answer is affirmative. The sequence proceeds to step S112 to store the list validating time and list invalidating time input in the memory as timer information.

Subsequently, step S113 inquires whether a list preparing manipulating is performed. If the person carrying the telephone C' inputs the number or numbers of one or a plurality of telephones and then performs a list preparing manipulation, the answer is affirmative. Step S114 then follows to prepare a position nonrecognizable list based on the input telephone numbers, followed by step S115, in which the list prepared is shown on the screen of the LCD and the data on the list is stored in the memory.

Subsequently step S116 inquires whether the timer information is stored in the memory. If the answer is negative, the sequence returns to step S111, whereas if the answer is affirmative, step S117 follows to inquire whether the list validating time included in the timer information is in match with the current time. When the answer is affirmative, a list valid flag is set at 1 in step S118, followed by step S111 again.

In the case where the answer to the inquiry of step S117 is negative, step S119 follows to inquire whether the list invalidating time included in the timer information is in match with the current time. If the answer is negative, step S111 follows again, whereas if the answer is affirmative, step S120 follows to set the list valid flag at 0, followed by step S111 again.

When the timer setting manipulation is performed in the procedure described, the list validating time and list invalidating time input are stored in the memory as timer information. Further when the list preparing manipulation is performed, a position nonrecognizable list is prepared, the list prepared is thereafter displayed on the screen of the LCD and the data on the list is stored in the memory.

Upon arrival of the list validating time, the list valid flag is set at 1, while when the list invalidating time arrives, the list valid flag is set at 0.

The control circuit of the telephone C' executes the same position information provision procedure as shown in FIG. 15 for the fourth embodiment. Accordingly, when an information transmission request signal is received, the position information is sent to the position information service center in the case where the password contained in the signal is in match with the password of its own, with the list valid flag set at 0, or in the case where the number of the demanded telephone is not included in the list data although the list valid flag is set at 1.

On the other hand, a position nonrecognizable message is sent to the service center when the password contained in the information transmission request signal is not in match with the password of its own, or when the number of the demanding telephone is included in the list data, with the list valid flag set at 1.

In the case where the person carrying the telephone C' has a time zone during which he does not want to have his own current position known, for example, to the person carrying a portable telephone D in the position information providing system of the present embodiment, he inputs the start time of the time zone as the list validating time and the termination time of the time zone as the list invalidating time. The list validating time and invalidating time thus input are stored in the memory as timer information.

The person carrying the telephone C' inputs the number of the telephone D and then performs a list preparing manipulation. When the manipulation is done, a position nonrecognizable list is prepared, the list prepared is thereafter shown on the screen of the LCD as seen in FIG. 3, and the data on the list is stored in the memory.

Subsequently, upon arrival of the list validating time, the list valid flag of the telephone C' is set at 1. Accordingly, even if the person carrying the telephone D performs a position information request manipulation in an attempt to recognize the current position of the person carrying the telephone C', the list valid flag is 1, and the number of the telephone D is found included in the list data, so that a position nonrecognizable message is sent from the telephone C' to the telephone D via the service center.

Further when the list invalidating time thereafter arrives, the list valid flag of the telephone C' is set at 0. Accordingly, if the person carrying the telephone D then performs a position information request manipulation in an attempt to recognize the current position of the person carrying the telephone C', the list valid flag is found to be 0, with the result that the position information is sent from the telephone C' to the telephone D by way of the service center.

Sixth Embodiment

As described above, the portable telephone is adapted to prepare position information periodically, and the position information stored in its memory is updated with the position information prepared every time the information is prepared. With the portable telephone C" of this embodiment, therefore, an inquiry is made as to whether the position information stored in its memory was updated within a specified period of time in the past, and the position information or a position nonrecognizable message is sent to a position information service center depending on the result of inquiry.

The telephone C" of the present embodiment is adapted to set a GPS position measuring function in an on state or off state alternatively, and to set a position measuring function off time and position measuring function on time as timer information. The GPS position measuring function is automatically set off upon arrival of the position measuring function off time, or is automatically set on upon arrival of the position measuring function on time.

Figure 17:
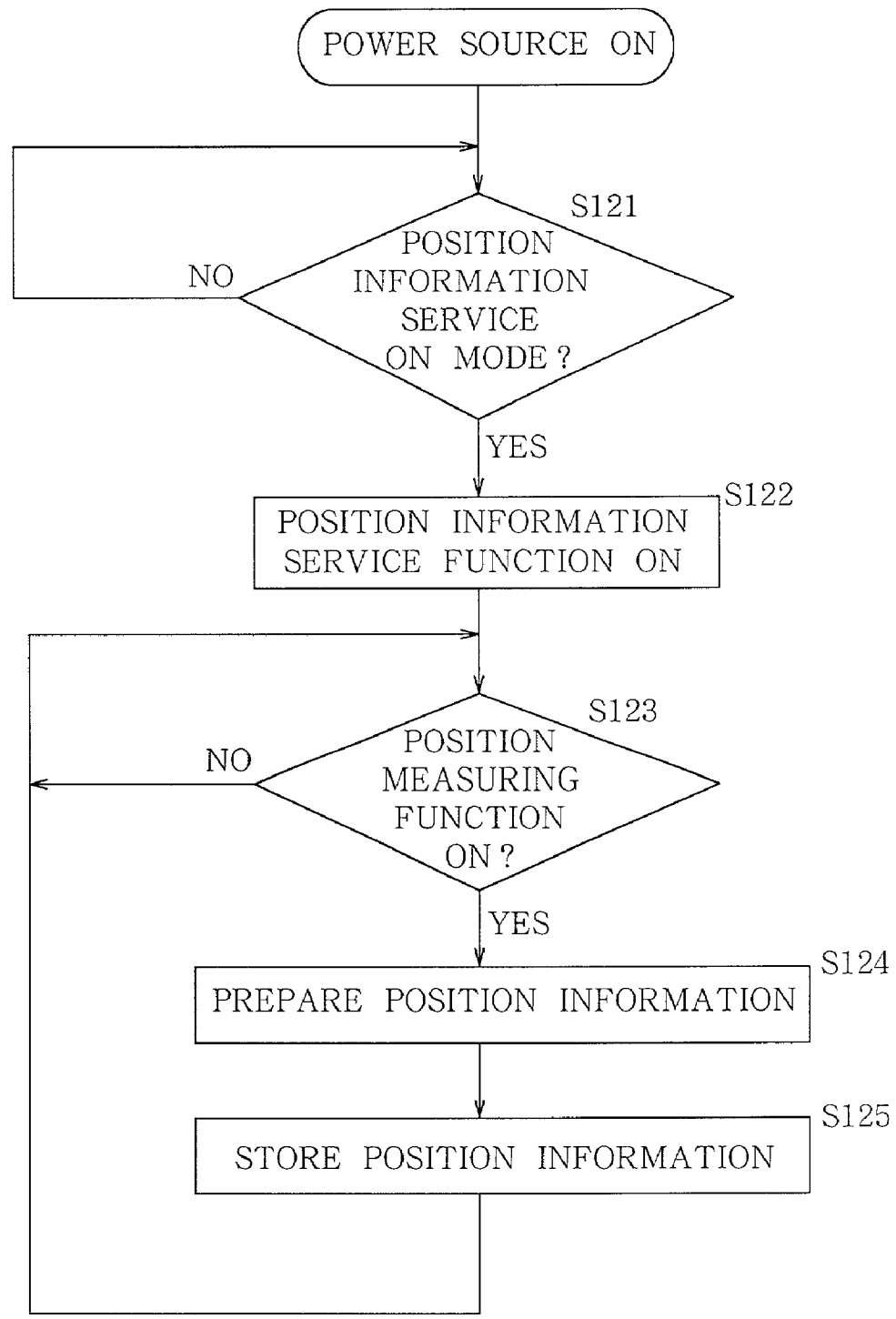
FIG. 17 is a flow chart showing the position information storage control procedure to be performed by the control circuit of a portable telephone C" of the sixth embodiment.

FIG. 17 shows the position information storage control procedure to be executed by the control circuit of the portable telephone C" of the present embodiment.

When the power source of the telephone body is turned on, an inquiry is made first in step S121 as to whether a position information service on mode is selected as illustrated. If the answer is negative, the same inquiry of step S121 is repeated, while if the answer is affirmative, step S122 follows to set a position information service function on. Subsequently in step S123, an inquiry is made as to whether the GPS position measuring function is set on. If the answer is negative, the same inquiry of step S123 is repeated. If the answer is affirmative, on the other hand, step S124 follows to prepare position information from the latitude and longitude included in the measurements obtained from the GPS processing circuit. The sequence then proceeds to step S125 to store the prepared position information in the memory, whereupon the sequence returns to step S123.

Thus, when the GPS position measuring function is on in the procedure described, position information is periodically prepared, and the position information stored in the memory is updated every time the information is prepared.

Figure 18:
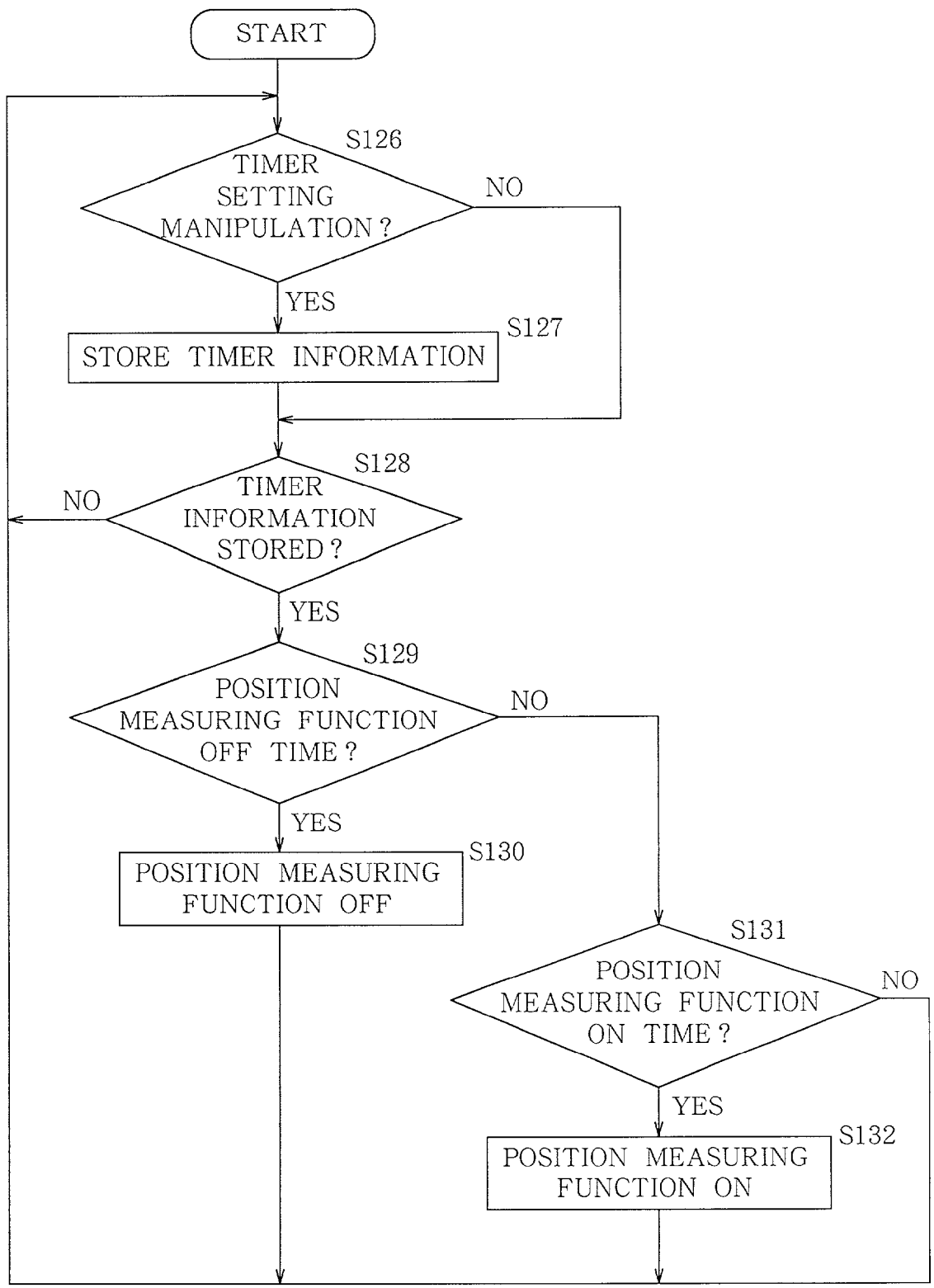
FIG. 18 is a flow chart showing the position measuring function on/off control procedure to be performed by the control circuit.

FIG. 18 shows the GPS position measuring function on/off control procedure to be executed by the control circuit of the portable telephone C". As illustrated, an inquiry is made first in step S126 as to whether a timer setting manipulation is performed. When the person carrying the telephone C" manipulates the input device to enter a position measuring function off time and a position measuring function on time, the answer is found to be affirmative, followed by step S127 to store the function off time and on time input in the memory as timer information.

Subsequently in step S128, an inquiry is made as to whether the timer information is stored in the memory. If the answer is negative, step S126 follows again, whereas if the answer is affirmative, step S129 follows to inquire whether the position measuring function off time included in the timer information is in match with the current time. When the answer is affirmative, step S130 follows to set the GPS position measuring function off. The sequence then returns to step S126.

If the answer to the inquiry of step S129 is negative, step S131 follows to inquire whether the position measuring function on time included in the timer information is in match with the current time. When the answer is negative, the sequence returns to step S126, while if the answer is affirmative, the GPS position measuring function is set on in step S132, followed by step S126 again.

When the timer setting manipulation is performed in the procedure described, the position measuring function off time and on time input are stored in the memory as timer information.

Subsequently upon arrival of the position measuring function off time, the GPS position measuring function is set off, while upon arrival of the position measuring function on time, the GPS position measuring function is set on.

Figure 19:
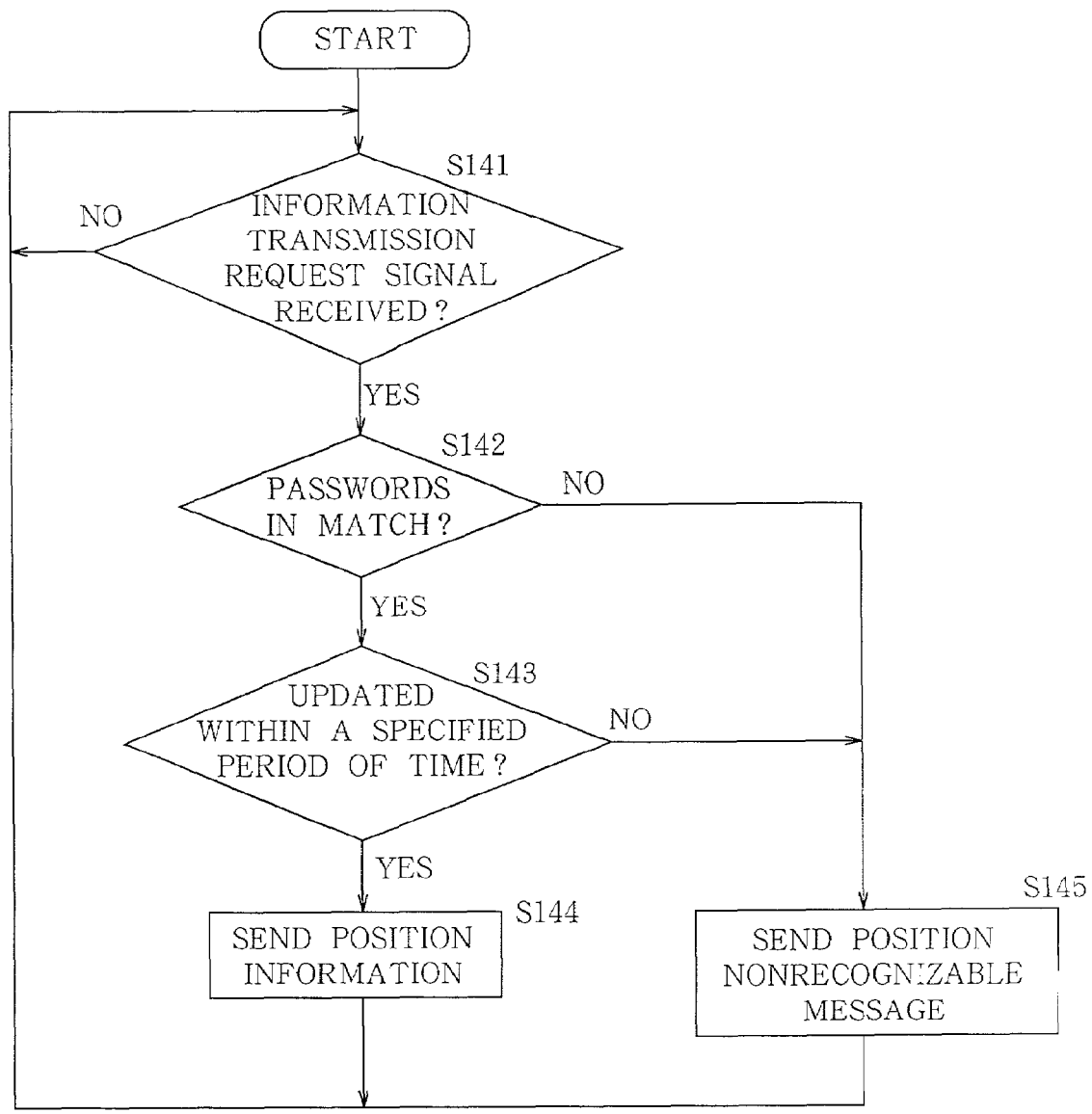
FIG. 19 is a flow chart showing the position information provision control procedure to be performed by the control circuit.
Figure 20:
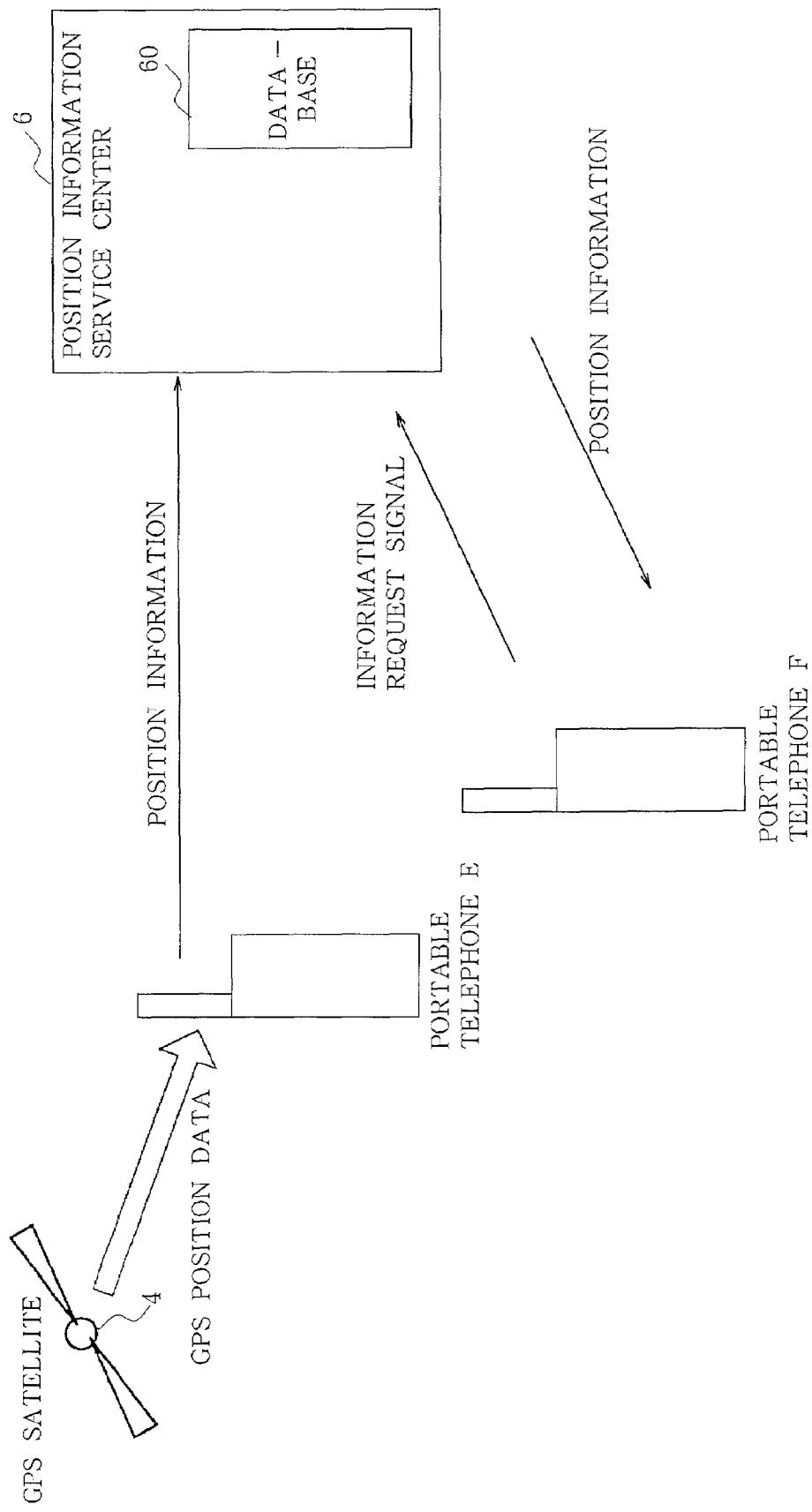
FIG. 20 is a block diagram showing the construction of a first position information providing system of the prior art.

FIG. 19 shows the position information provision control procedure to be executed by the control circuit of the portable telephone C". As illustrated, an inquiry is made first in step S141 as to whether an information transmission request signal is received. When the answer is negative, the same inquiry of step S141 is repeated, whereas if the answer is affirmative, step S142 follows to inquire whether the password data contained in the request signal is in match with the password data of its own. If the answer is negative, a position nonrecognizable message is sent to the service center in step S145, and the sequence then returns to step S141.

When the inquiry of step S142 is answered in the affirmative, on the other hand, step S143 follows to inquire whether the position information stored in the memory was updated within a specified period of time in the past, e.g., within 5 minutes in the past. When the answer is affirmative, step S144 follows to send the position information stored in the memory to the service center. Step S141 thereafter follows again. If the answer is negative, on the other hand, step S145 follows to send a position nonrecognizable message to the service center, followed by step S141 again.

When the information transmission request signal is received in the procedure described, the position information is sent to the service center if the password contained in the signal is in match with the password of its own and if the position information was updated within a specified period of time in the past.

When the password contained in the information transmission request signal is not in match with the password of its own, or if the position information was not updated within the specified period of time in the past, a position nonrecognizable message is sent to the service center.

In the case where the person carrying the telephone C" has a time zone during which he does not want to have his current position known, for example, to the person carrying a telephone D in the position information providing system of the present embodiment, the start time of the time zone is input as the position measuring function off time and the termination time of the time zone as the position measuring function on time.

When the position measuring function off time thereafter arrives, the GPS position measuring function of the telephone C" is set off to discontinue updating the position information in the memory. Accordingly, even if the person carrying the telephone D thereafter performs a position information request manipulation in an attempt to recognize the current position of the person carrying the telephone C", the position information is not found to have been updated for the specified period of time in the past, with the result that a position nonrecognizable message is sent from the telephone C" to the telephone D via the service center.

Further when the position measuring function on time thereafter arrives, the GPS position measuring function of the telephone C" is set on to resume updating of the position information. Accordingly, if the person carrying the telephone D thereafter performs a position information request manipulation in an attempt to recognize the current position of the person carrying the telephone C", the position information is found to have been updated during the specified period of time in the past. The position information is sent from the telephone C" to the telephone D by way of the service center.

The foregoing description of the embodiments is intended to illustrate the present invention and should not be construed as limiting the claimed invention or reducing the scope thereof. The systems of the invention are not limited to the above embodiments in construction but can of course be modified variously without departing from the spirit of the invention as set forth in the appended claims.

For example, it is possible to prepare a list comprising the number or numbers of one or a plurality of telephones for which the position information can be provided, or to prepare a list of flags representing acceptability of the number or numbers of portable telephone or telephones for the provision of the position information.

It is also possible to transmit the list data to the position information service center a predetermined period of time before the list transmitting time and to send a list cancel signal to the center a predetermined period of time before the list cancel time.

Furthermore, the GPS position measuring function can be set off in response to a GPS position measuring function off manipulation, and can be set on in response to a GPS position measuring function on manipulation.

The telephone antenna 11 and GPS antenna 20 can be replaced by a single antenna which is serviceable as both telephone antenna and GPS antenna.

Although the portable communications device embodying the invention is a portable or mobile telephone, the device is usable as other known portable communication device.

What is claimed is:

1. In a position information providing system comprising a portable communications device capable of measuring position information representing the position of the device based on position data received from a plurality of position reference stations arranged on a satellite and/or the ground and transmitting the position information by radio communication, and a position information providing device capable of receiving and holding the position information transmitted from the portable communications device and transmitting the position information to one or a plurality of terminal communications units, a position information providing method comprising the steps of:

causing the portable communications device to discontinue the position information measuring operation in response to a position measurement discontinuing manipulation by a user or upon arrival of a position measurement discontinuing time set by the user; and causing the position information providing device to check, in response to a position information request command from the terminal communications unit, whether the position information as to the portable communications device is held by the position information providing device during a specified period of time before the reception of the command until the reception and to transmit the position information to the terminal communications unit only when the position information is found to be held during the specified period.

2. A position information providing system comprising a portable communications device capable of transmitting by radio communication position information representing the position of the device, and a position information providing device capable of receiving the position information transmitted from the portable communications device and transmitting the position information to one or a plurality of terminal communications units, the portable communications device comprising:

means for preparing a list required for checking whether it is approved to provide the position information for said one or plurality of terminal communications units in response to an information input manipulation by a user:

time setting means for setting a list transmitting time input by the user;

time detecting means for detecting arrival of the list transmitting time set by the time setting means; and transmitting means for converting data as to the prepared list to a radio signal and transmitting the radio signal to the position information providing device upon the time detecting means detecting the arrival of the list transmitting time, the position information providing device comprising:

means for receiving the list data from the portable communications device;

list register means for registering the list data;

information processing means for registering the received list data in the list register means;

means for checking whether provision of the position information for the terminal communications unit is approved based on the list data registered in the list register means, in response to a position information request command from the terminal communications unit; and means for transmitting the position information as to the portable communications device to the terminal communications unit only when provision of the position information is found approved.

3. A position information providing system according to claim 2, wherein the time setting means of the portable communications device sets a list invalidating time input by the user, the time detecting means being operable to detect arrival of the list invalidating time set by the time setting means, and the transmitting means of the portable communications device transmits a list invalidation command signal as converted to a radio signal to the position information providing device upon the time detecting means detecting arrival of the list invalidating time, the position information providing means comprising invalidation processing means for invalidating registration of the list data in the list register means upon the receiving means thereof receiving the list invalidation command signal.

4. A position information providing system comprising a portable communications device capable of transmitting by radio communication position information representing the position of the device, and a position information providing device capable of receiving the position information transmitted from the portable communications device and transmitting the position information to one or a plurality of terminal communications units, the portable communications device comprising:
   means for preparing a list required for checking whether it is approved to provide the position information for said one or plurality of terminal communications units in response to an information input manipulation by a user; and
   transmitting means for converting data as to the prepared list to a radio signal and transmitting the radio signal to the position information providing device, and transmitting a list invalidation command signal as converted to a radio signal to the position information providing device in response to a list invalidating manipulation by the user, the position information providing device comprising:
   means for receiving the list data from the portable communications device;
   list register means for registering the list data;
   information processing means for registering the received list data in the list register means;
   means for checking whether provision of the position information for the terminal communications unit is approved based on the list data registered in the list register means, in response to a position information request command from the terminal communications unit; and
   means for transmitting the position information as to the portable communications device to the terminal communications unit only when provision of the position information is found approved; and
   invalidation processing means for invalidating registration of the list data in the list register means upon the receiving means thereof receiving the list invalidation command signal.

5. A position information providing system comprising a portable communications device capable of transmitting by radio communication position information representing the position of the device, and a position information providing device capable of receiving the position information transmitted from the portable communications device and transmitting the position information to one or a plurality of terminal communications units, the portable communications device comprising:
   means for receiving position data from a plurality of position reference stations arranged on a satellite and/or the ground;
   position measuring means for measuring the position information based on the position data received;
   transmitting means for converting the measured position information to a radio signal and transmitting the radio signal to the position information providing device; and
   control means for discontinuing the information measuring operation of the position measuring means in response to a position measurement discontinuing manipulation by a user,
   the position information providing device comprising:
   means for receiving a position signal from the portable communications device;
   means for storing the position information as to the portable communications device;
   information processing means for performing the operation of storing the received position information in the storing means;
   checking means operable in response to a position information request command from the terminal communications unit to check whether the position information as to the portable communications device is stored in the storing means during a specified period of time before the reception of the command until the reception; and
   means for transmitting the position information to the terminal unit only when the position information as to the portable communications device is stored during the specified period of time.

6. A position information providing system comprising a portable communications device capable of transmitting by radio communication position information representing the position of the device, and a position information providing device capable of receiving the position information transmitted from the portable communications device and transmitting the position information to one or a plurality of terminal communications units, the portable communications device comprising:
   means for receiving position data from a plurality of position reference stations arranged on a satellite and/or the ground;
   position measuring means for measuring the position information based on the position data received;
   time setting means for setting a position measurement discontinuing time input by a user;
   time detecting means for detecting arrival of the position measurement discontinuing time set by the time setting means;
   transmitting means for converting the measured position information to a radio signal and transmitting the radio signal to the position information providing device; and
   control means for discontinuing the information measuring operation of the position measuring means upon the time detecting means detecting arrival of the position measurement discontinuing time,
   the position information providing device comprising:
   means for receiving the position information from the portable communications device;
   means for storing the position information as to the portable communications device;
   information processing means for performing the operation of storing the received position information in the storing means;
   checking means operable in response to a position information request command from the terminal communications unit to check whether the position information as to the portable communications device is stored in the storing means during a specified period of time before the reception of the command until the reception; and means for transmitting the position information to the terminal unit only when the position information as to the portable communications device is stored during the specified period of time.

7. A position information providing system according to claim 5 or 6, wherein when the position information as to the portable communications device is not found stored during the specified period of time, the transmitting means of the providing device transmits to the terminal unit notification information to the effect that provision of the position information is not approved.

8. A position information providing system according to claim 5 or 6, wherein the control means of the portable communications device causes the position measuring means to start the operation of measuring the information in response to a position measurement resuming manipulation by the user.

9. A position information providing system according to claim 6, wherein the time setting means of the portable communications device sets a position measurement resuming time input by the user, the time detecting means detects arrival of the position measurement resuming time set by the time setting means, and the control means causes the position measuring means to start the information measuring operation upon the time detecting means detecting arrival of the position measurement resuming time.

10. A portable communications device capable of transmitting by radio communication position information representing the position of the device to one or a plurality of terminal communications units via a position information providing device, the portable communications device comprising:

means for preparing a list required for checking whether it is approved to provide the position information for said one or plurality of terminal communications units in response to an information input manipulation by a user;

time setting means for setting a list transmitting time input by the user;

time detecting means for detecting arrival of the list transmitting time set by the time setting means; and transmitting means for converting data as to the prepared list to a radio signal and transmitting the radio signal to the position information providing device upon the time detecting means detecting the arrival of the list transmitting time.

11. A portable communications device capable of transmitting by radio communication position information representing the position of the device to one or a plurality of terminal communications units via a position information providing device, the portable communications device comprising:

means for receiving position data from a plurality of position reference stations arranged on a satellite and/or the ground;

position measuring means for measuring the position information based on the position data received;

time setting means for setting a position measurement discontinuing time input by a user, and setting a position measurement resuming time input by the user;

time detecting means for detecting arrival of the position measurement discontinuing time and the position measurement resuming time set by the time setting means;

transmitting means for converting the measured position information to a radio signal and transmitting the radio signal to the position information providing device; and control means for discontinuing the information measuring operation of the position measuring means upon the time detecting means detecting arrival of the position measurement discontinuing time, and starting the information measuring operation of the position measuring means upon the time detecting means detecting arrival of the position measurement resuming time.

12. A position information providing device capable of receiving from a portable communications device position information representing the position of the portable device and transmitting the position information to one or a plurality of terminal communications units, the providing device comprising:

means for receiving the position information from the portable communications device;

means for storing the position information as to the portable communications device;

information processing means for performing the operation of storing the received position information in the storing means;

checking means operable in response to a position information request command from the terminal communications unit to check whether the position information as to the portable communications device is stored in the storing means during a specified period of time before the reception of the command until the reception; and means for transmitting the position information to the terminal unit only when the position information as to the portable communications device is stored during the specified period of time.

13. In a portable communications device capable of measuring and holding position information representing the position of the device based on position data received from a plurality of position reference stations on a satellite and/or the ground and transmitting the position information to one or a plurality of terminal communications units by radio communication, the method comprising the steps of:

discontinuing the position information measuring operation in response to a position measurement discontinuing manipulation by a user or upon arrival of a position measurement discontinuing time set by the user; and checking, in response to a position information request command from the terminal communications unit, whether the position information as to the portable communications device is held during a specified period of time before the reception of the command until the reception and transmitting the position information as converted to a radio signal to the terminal communications unit only when the position information is found to be stored during the specified period.

14. A portable communications device capable of transmitting position information representing the position of the device to one or a plurality of terminal communications units by radio communication, the portable communications device comprising:

means for preparing a list required for checking whether it is approved to provide the position information for said one or plurality of terminal communications units in response to an information input manipulation by a user;

list register means for registering the data on the list;

information processing means for registering the prepared list data in the list register means, and validating the list data registered in the list register means in response to a list validating manipulation by the user; and means for checking whether provision of the position information for the terminal communications unit is approved based on the list data registered in the list register means, in response to a position information request command from the terminal communications unit; and means for transmitting the position information as converted to a radio signal to the terminal communications unit only when provision of the position information is found approved.

15. A portable communications device according to claim 14, wherein the information processing means invalidates the list data registered in the list register means in response to a list invalidating manipulation by the user.

16. A portable communications device capable of transmitting position information representing the position of the device to one or a plurality of terminal communications units by radio communication, the portable communications device comprising:

means for preparing a list required for checking whether it is approved to provide the position information for said one or plurality of terminal communications units in response to an information input manipulation by a user;

list register means for registering the data on the list;

time setting means for setting a list validating time input by the user;

time detecting means for detecting arrival of the list validating time set by the time setting means, information processing means for registering the prepared list data, and validating the list register means upon the time detecting means detecting arrival of the list validating time;

means for checking whether provision of the position information for the terminal communications unit is approved based on the list data registered in the list register means when the list data is valid, in response to a position information request command from the terminal communications unit; and means for transmitting the position information as converted to a radio signal to the terminal communications unit only when provision of the position information is found approved.

17. A portable communications device according to claim 16, wherein the time setting means sets a list invalidating time input by the user, the time detecting means detects arrival of the list invalidating time set by the time setting means, and the information processing means invalidates the list data registered in the list register means upon the time detecting means detecting arrival of the list invalidating time.

18. A portable communications device capable of transmitting position inflation representing the position of the device to one or a plurality of terminal communications units by radio communication, the portable communications device comprising:

means for receiving position data from a plurality of position reference stations arranged on a satellite and/or the ground;

position measuring means for measuring the position information based on the position data received;

means for storing the position information;

information processing means for performing the operation of storing the measured position information in the storing means;

control means for discontinuing the information measuring operation of the position measuring means in response to a position measurement discontinuing manipulation by a user;

checking means operable in response to a position information request command from the terminal communications unit to check whether the position information is stored in the storing means during a specified period of time before the reception of the command until the reception; and means for transmitting the position information as converted to a radio signal to the terminal communications unit only when the position information is stored during the specified period of time.

19. A portable communications device capable of transmitting position information representing the position of the device to one or a plurality of terminal communications units by radio communication, the portable communications device comprising:

means for receiving position data from a plurality of position reference stations arranged on a satellite and/or the ground;

position measuring means for measuring the position information based on the position data received;

means for storing the position information;

information processing means for performing the operation of storing the measured position information in the storing means;

time setting means for setting a position measurement discontinuing time input by a user;

time detecting means for detecting arrival of the position measurement discontinuing time set by the time setting means;

control means for discontinuing the information measuring operation of the position measuring means upon the time detecting means detecting arrival of the position measurement discontinuing time;

checking means operable in response to a position information request command from the terminal communications unit to check whether the position information is stored in the storing means during a specified period of time before the reception of the command until the reception; and means for transmitting the position information as converted to a radio signal to the terminal communications unit only when the position information is stored during the specified period of time.

20. A portable communications device according to claim 18 or 19, wherein when the position information is not found stored during the specified period of time, the transmitting means converts to a radio signal notification information to the effect that provision of the position information is not approved and transmits the radio signal to the terminal communications unit.

21. A portable communications device according to claim 18 or 19, wherein the control means causes the position measuring means to start the information measuring operation in response to a position measurement resuming manipulation by the user.

22. A portable communications device according to claim 19, wherein the time setting means sets a position measurement resuming time input by the user, the time detecting means detects arrival of the position measurement resuming time set by the time setting means, and the control means causes the position measuring means to start the information measuring operation upon the time detecting means detecting arrival of the position measurement resuming time.

* * * * *

UNITED STATES PATENT AND TRADEMARK OFFICE
CERTIFICATE OF CORRECTION

PATENT NO. : 7,006,835 B2 Page 1 of 1
APPLICATION NO. : 10/036516
DATED : February 28, 2006
INVENTOR(S) : Otsuka et al.

It is certified that error appears in the above-identified patent and that said Letters Patent is hereby corrected as shown below:

In column 22;
on line 43 change "user:" to be -- user; --

In column 27;
one line 55 change "position inflation representing" to be -- position information representing --

Signed and Sealed this

Fifteenth Day of August, 2006

JON W. DUDAS
*Director of the United States Patent and Trademark Office*